United States Patent [19]
Katsube et al.

[11] Patent Number: 6,144,661
[45] Date of Patent: Nov. 7, 2000

[54] NETWORK NODE APPARATUS AND VIRTUAL CONNECTION CONTROL METHOD FOR PROVIDING VARIOUS SERVICE ATTRIBUTES IN MULTICAST COMMUNICATION

[75] Inventors: Yasuhiro Katsube, Kanagawa-ken; Takeshi Saito; Hisako Tanaka, both of Tokyo, all of Japan

[73] Assignee: Kabushiki Kaisha Toshiba, Kawasaki, Japan

[21] Appl. No.: 08/794,704

[22] Filed: Feb. 4, 1997

[30] Foreign Application Priority Data

Feb. 5, 1996 [JP] Japan .................................. 8-018990

[51] Int. Cl.[7] .................................................. H04L 12/56
[52] U.S. Cl. ...................... 370/390; 370/397; 370/399; 370/400; 370/408; 370/409
[58] Field of Search ..................................... 370/389, 390, 370/395, 397, 399, 475, 400, 401, 396, 408, 409

[56] References Cited

U.S. PATENT DOCUMENTS

| | | | |
|---|---|---|---|
| 5,153,877 | 10/1992 | Esaki et al. | 370/389 |
| 5,592,476 | 1/1997 | Calamvokis et al. | 370/390 |
| 5,742,772 | 4/1998 | Sreenan | 395/200.56 |
| 5,777,986 | 7/1998 | Grossman | 370/235 |

*Primary Examiner*—Hassan Kizou
*Assistant Examiner*—Mitchell Slavitt
*Attorney, Agent, or Firm*—Finnegan, Henderson, Farabow, Garrett & Dunner, L.L.P.

[57] ABSTRACT

A system for forming one point-to-multipoint connection provides various service attributes in an ATM network in response to differences in service attributes requested by receiving parties or differences in available resources. A network node sets up an output VC (Virtual Channel) link to be connected to an input VC link, the VC links being parts of a point-multipoint connection, receives a new VC link set-up request, and adds to the point-multipoint connection, in response to the new VC link set-up request, new output VC link with service attribute different from that of the input VC link.

47 Claims, 13 Drawing Sheets

RESOURCE MANAGEMENT TABLE
401

| CALL IDENTIFIER | OUTPUT LINK | VPI/VCI | ALLOCATED RESOURCE |
|---|---|---|---|
| 10 | 1 | 30/55 | 10 Mbps |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE |
|---|---|---|---|---|
| 10 | 1 | 30/55 | 201 | CBR, 10 Mbps, CLR=10−8 |

*FIG. 3a*

RESOURCE MANAGEMENT TABLE
401

| CALL IDENTIFIER | OUTPUT LINK | VPI/VCI | ALLOCATED RESOURCE |
|---|---|---|---|
| 10 | 1 | 30/55 | 10 Mbps |
| 10 | 2 | 80/40 | 0 Mbps |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE |
|---|---|---|---|---|
| 10 | 1 | 30/55 | 201 | CBR, 10 Mbps, CLR=10−8 |
| 10 | 2 | 80/40 | 202 | UBR |

*FIG. 3b*

RESOURCE MANAGEMENT TABLE
401

| CALL IDENTIFIER | OUTPUT LINK | VPI/VCI | ALLOCATED RESOURCE |
|---|---|---|---|
| 10 | 1 | 30/55 | 10 Mbps |
| 10 | 2 | 80/40 | 10 Mbps |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE |
|---|---|---|---|---|
| 10 | 1 | 30/55 | 201 | CBR, 10 Mbps, CLR=10−8 |
| 10 | 2 | 80/40 | 202 | UBR |
| 10 | 2 | 80/40 | 203 | CBR, 10 Mbps, CLR=10−8 |

*FIG. 3c*

RESOURCE MANAGEMENT TABLE
401

| CALL IDENTIFIER | OUTPUT LINK | VPI/VCI | ALLOCATED RESOURCE |
|---|---|---|---|
| 10 | 1 | 30/55 | 10 Mbps |
| 10 | 2 | 80/40 | 0 Mbps |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE |
|---|---|---|---|---|
| 10 | 1 | 30/55 | 201 | CBR, 10 Mbps, CLR=10-8 |
| 10 | 2 | 80/40 | 202 | UBR |
| 10 | 2 | 80/40 | 203 | UBR |

*FIG. 3d*

RESOURCE MANAGEMENT TABLE
401

| CALL IDENTIFIER | OUTPUT LINK | VPI/VCI | ALLOCATED RESOURCE |
|---|---|---|---|
| 10 | 2 | 80/40 | 0 Mbps |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE |
|---|---|---|---|---|
| 10 | 1 | 80/40 | 202 | UBR |
| 10 | 2 | 80/40 | 203 | UBR |

*FIG. 3e*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | ○ |

*FIG. 7a*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 0 Mbps | ON |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | ○ |
| 10 | 2 | 80/40 | 202 | CBR, 10 Mbps, CLR=10-8 | × |

*FIG. 7b*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | ○ |
| 10 | 2 | 80/40 | 202 | CBR, 10 Mbps, CLR=10-8 | ○ |

*FIG. 7c*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |

*FIG. 10a*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |
| 10 | 2 | 80/40 | 202 | CBR, 10 Mbps, CLR=10-8 | O |

*FIG. 10b*

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |
| 10 | 2 | 80/40 | 202 | CBR, 10 Mbps, CLR=10-8 | O |

*FIG. 10c*

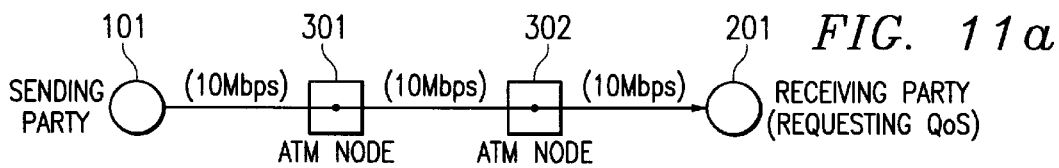
FIG. 11a
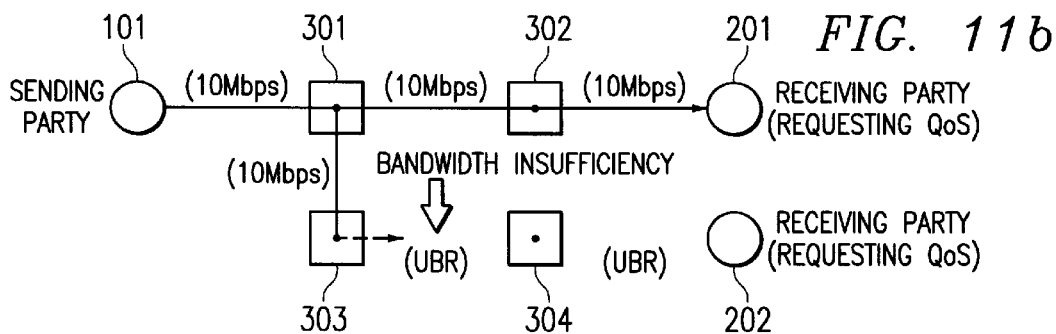
FIG. 11b
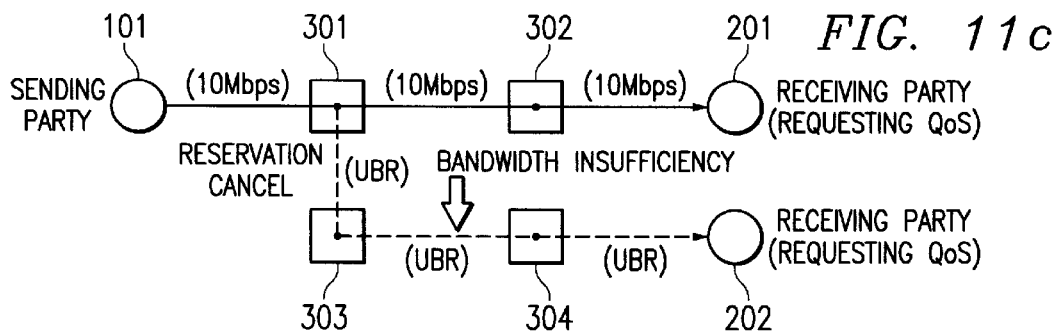
FIG. 11c
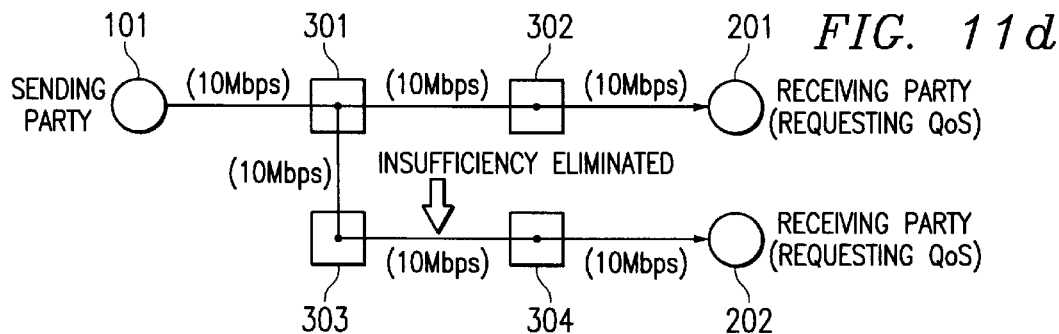
FIG. 11d
RESOURCE MANAGEMENT TABLE
401
FIG. 12a
| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
SERVICE ATTRIBUTE MANAGEMENT TABLE
402
| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |
| 10 | 2 | 80/40 | 202 | CBR, 10 Mbps, CLR=10-8 | O |

FIG. 12b

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 0 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |
| 10 | 2 | 80/40 | 202 | CBR, 10 Mbps, CLR=10-8 | X |

FIG. 12c

RESOURCE MANAGEMENT TABLE
401

| CALL IDENTIFIER | OUTPUT LINK | VPI/VCI | ALLOCATED RESOURCE | INSUFFICIENCY TAG |
|---|---|---|---|---|
| 10 | 1 | 30/55 | 10 Mbps | OFF |
| 10 | 2 | 80/40 | 10 Mbps | OFF |

SERVICE ATTRIBUTE MANAGEMENT TABLE
402

| CALL IDENTIFIER | OUTPUT LINK | VPI/VCI | RECEIVING PARTY ADDRESS | SERVICE ATTRIBUTE | SATISFACTION |
|---|---|---|---|---|---|
| 10 | 1 | 30/55 | 201 | CBR, 10 Mbps, CLR=10-8 | O |
| 10 | 2 | 80/40 | 202 | CBR, 10 Mbps, CLR=10-8 | O |

FIG. 12d

NETWORK NODE APPARATUS AND VIRTUAL CONNECTION CONTROL METHOD FOR PROVIDING VARIOUS SERVICE ATTRIBUTES IN MULTICAST COMMUNICATION

I. BACKGROUND OF THE INVENTION

A. Field of the Invention

The present invention relates generally to a multicast communication in a connection-oriented (e.g., asynchronous transfer mode (ATM)) network, and more particularly to adaptable multicast data communication services.

B. Description of the Related Art

Conventional multicast communication services that distribute data to several receiving parties in an ATM network allow the sending party to send the data to all receiving parties by setting up a point-multipoint ATM connection from the sending party to all receiving parties. When the sending party simply sends data to the point-multipoint connection without copying the data for each receiving party, the data are simply transmitted to all the receiving parties. In this context, the sending/receiving party could be an actual source/destination host, or could be a connectionless packet relaying node, such as a router.

Conventionally, service attributes, such as bandwidth or quality of service (QoS), that are provided by this point-to-multipoint connection are the same for all receiving parties. This restriction, however, may give rise to certain problems.

For example, sometimes the service attributes requested by the receiving parties are different. One party may request a reliable guarantee of fixed bandwidth, even though it may involve some degree of communication cost, while another receiving party requests low cost communication without any guarantee of QoS. One method of handling these different requests is to set up a point to multipoint connection to all receiving parties with the same service attributes satisfying the requests of the most demanding receiving party.

However, this method requires guaranteeing the prescribed resource end-to-end in the network even for a receiving party who has not requested such a QoS guarantee. Such a guarantee is undesirable both from the point of view of efficient utilization of network resources and from the point of view of providing low cost communications.

Another method for implementing ATM multicast communication when the requested service attributes differ depending on the receiving party is to divide the receiving parties into groups. The receiving parties belonging to each group are the ones whose requested service attributes are the same (or similar). Then, point-to-multipoint connections can be set up for each group separately. In the extreme case, however, this method can result in the sending party setting up the same number of point-to-point connections as the number of receiving parties.

The problems with this method are that the sending party must copy data as many times as the number of connections set up, depending on the attributes to output the data to each connection, and that bandwidth in the portion of the network close to the sending party (the sending-side user network interface) is wasted.

Another problem with providing point-to-multipoint connection of the same service attributes for all receiving parties is that it may not be possible to reserve bandwidth within the network for some of the receiving parties. Trying to add a new "leaf" with a certain service attribute to a point-to-multipoint connection for a new receiving party results in denying the leaf-adding request if sufficient bandwidth cannot be reserved to satisfy the service attribute on the path to the receiving party. This means the new receiving party will be unable to receive any data if sufficient bandwidth to satisfy the service attribute is not available anywhere on the path to the new receiving party.

Even in this case, the receiving party can receive data if the sending party sets up another connection to the receiving party with a different service attribute (e.g., a service with no QoS guarantee). However, the processing burden will still remain on the sending party for copying data, and bandwidth will be wasted in the portion of the network close to the sending party.

II. SUMMARY OF THE INVENTION

It is therefore a desire of the present invention to provide a system for forming one point-to-multipoint connection which provides various service attributes responsive to differences in the service attributes requested by receiving parties and/or differences in the available bandwidth.

Specifically, a network node apparatus consistent with this invention for multicast communication service to transmit communication data from a sending party to multiple receiving parties using an input VC (Virtual Channel) and output VCs, the node comprises: multicast maintenance means for maintaining a point-multipoint connection ("p-mp VC") to be used for the multicast communication service; reception means for receiving a new VC link creation request for the multicast communication service and a requested service attribute for the new VC link; and creation means for adding to the point-multipoint connection, in response to the new VC link creation request, a new output VC link. The creation means includes means for examining the requested service attribute, and means for adding the output VC link with a service attribute that differs from a service attribute of the input VC link.

A method consistent with this invention for controlling a multicast communication service in a connection-oriented network to transmit communication data from a sending party to multiple receiving parties via Virtual Channels (VCs) comprises the steps of: maintaining output VC links to be connected to an input VC link, the VC links being parts of a point-multipoint connection used for the multicast communication service; receiving a new VC link creation request; and adding a new output VC link to the point-multipoint connection in response to the receipt of a new VC link creation request. The output VC link has a service attribute that is the smaller of a service attribute of the input VC link and a service attribute requested for said new output VC link.

Other features and advantages of the present invention will become apparent from the following description taken in conjunction with the accompanying drawings.

Both the foregoing general description and the following detailed description provide examples consistent with this invention and explain how to make and use systems and methods consistent with the invention. These descriptions do not restrict the claimed invention.

III. BRIEF DESCRIPTION OF THE DRAWINGS

The accompanying drawings, which are incorporated in and constitute a part of this specification, illustrate an implementation of the invention and, together with the description, explain the principles of the invention. In the drawings:

FIG. 1 is a functional block diagram of a connection control unit provided at an ATM node.

FIGS. 2(a)–(e) shows an example of how the p-mp VC transits according to the addition, alteration, and the deletion in an exemplary ATM network.

FIGS. 3(a)–(e) show how the information relating to network resource management possessed by ATM node 301 changes with time corresponding to FIG. 2.

Figure 6A:
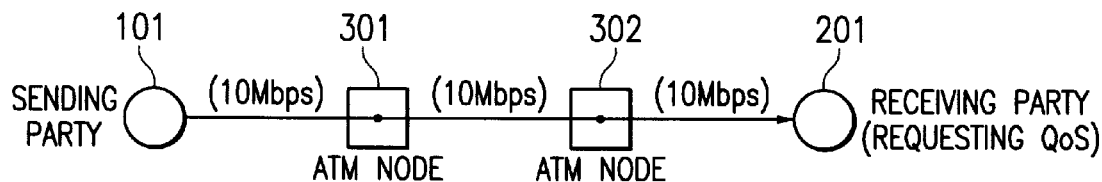
Figure 6B:
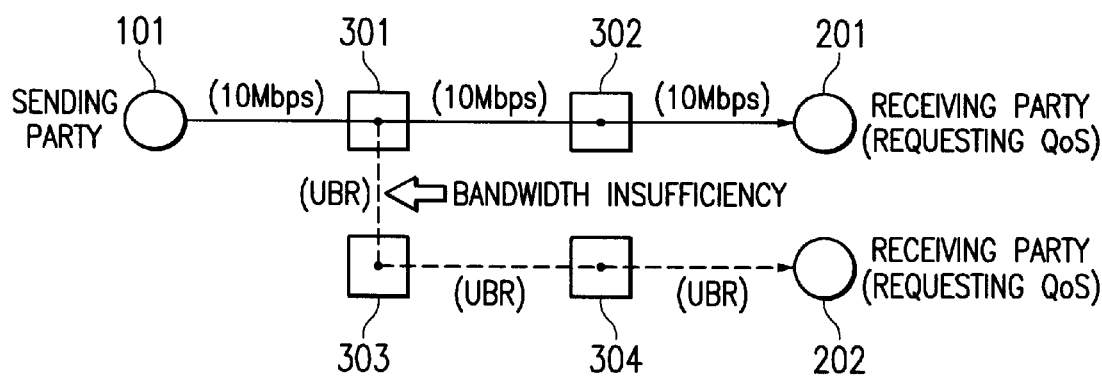
Figure 6C:
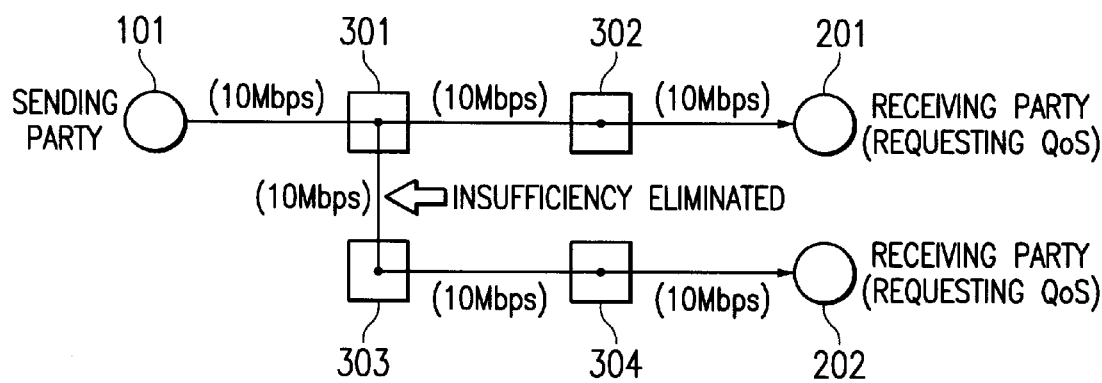

FIGS. 6(a)–(c) show an example of how the p-mp VC transits according to the addition of a new receiving party in an exemplary ATM network in case where bandwidth insufficiency occurs at branching point of the p-mp VC.

FIGS. 7(a)–(c) show how the information relating to network resource management possessed by ATM node 301 changes with time corresponding to FIG. 6.

Figure 8:
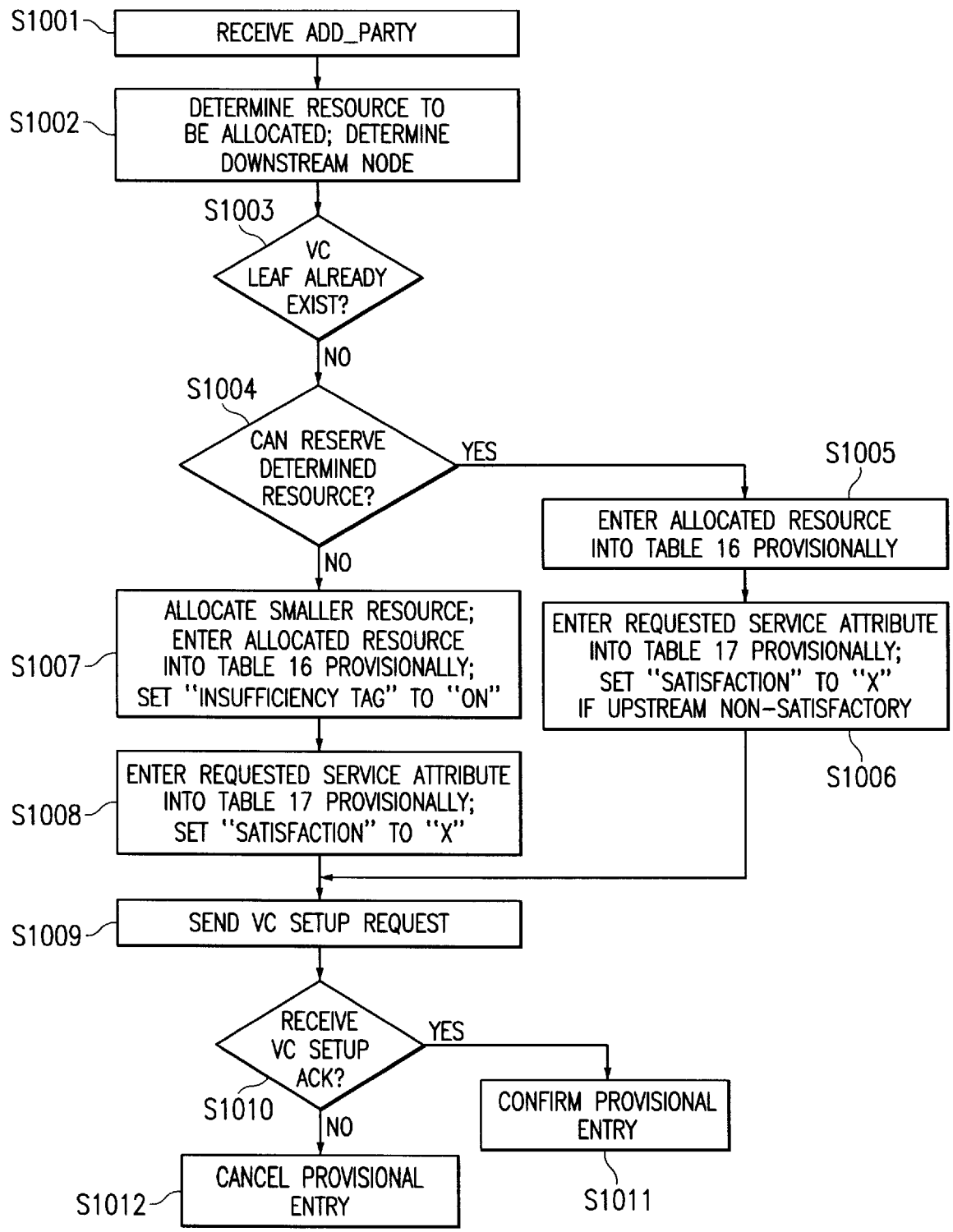

FIG. 8 shows a processing algorithm at the ATM node that can deal with bandwidth insufficiency.

Figure 9A:
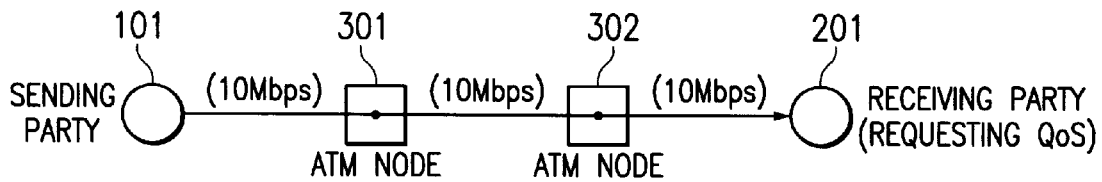
Figure 9B:
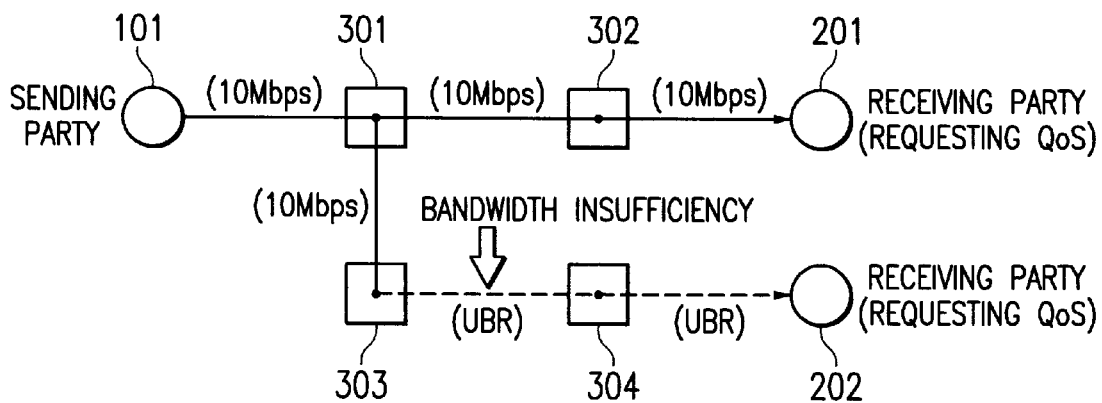
Figure 9C:
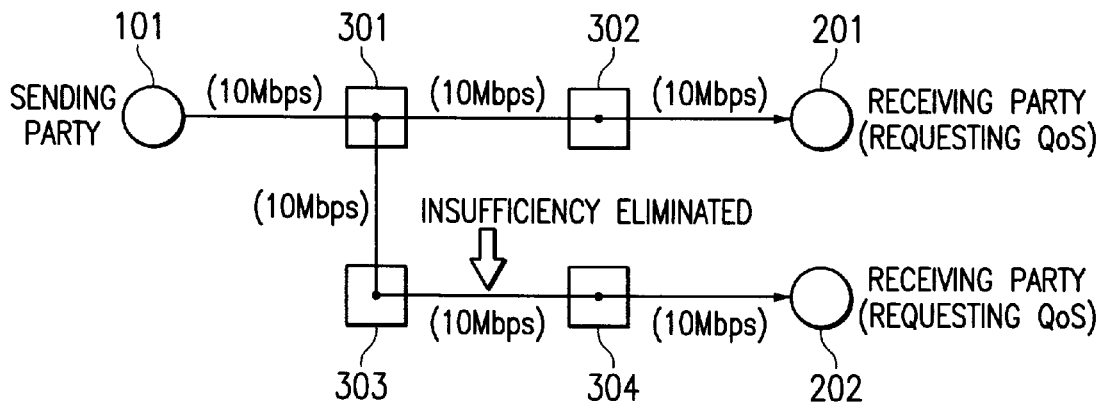

FIGS. 9(a)–(c) show an example of how the p-mp VC transits according to the addition of a new receiving party in an exemplary ATM network where the output link bandwidth is insufficient downstream of the branching point of the p-mp VC.

FIGS. 10(a)–(c) show how the information in resource management table 401 and service attribute management table 402 possessed by ATM node 301 changes with time corresponding to FIG. 9.

FIGS. 11(a)–(d) show another example of how the p-mp VC transits according to the addition of a new receiving party in an exemplary ATM network where the output link bandwidth is insufficient downstream of the branching point of the p-mp VC.

FIGS. 12(a)–(d) show how the information in resource management table 401 and service attribute management table 402 possessed by ATM node 301 changes with time corresponding to FIG. 11.

IV. DESCRIPTION OF THE PREFERRED IMPLEMENTATIONS

A. General Overview

A "node" constitutes a connection-oriented (e.g., ATM) network that can provide multicast communication services. From the present node to a downstream node, an output VC (Virtual Channel) link that is a part of a point-multipoint connection to be used for the multicast communication service is set up. When a new receiving party requests participation in the multicast communication service, a new output VC link from the present node to a new downstream node is added to the point-multipoint connection.

The present node creates, as a new part of the point-multipoint connection, a new output VC link from the present node to a downstream node with a communication resource corresponding to the requested service attribute. If necessary, the present node creates a new VC link with a service attribute that is different from the service attribute provided on the input VC link from an upstream node to the present node that is part of the point-multipoint connection. The creation of new VC links is repeated until the point-multipoint connection reaches the new receiving party.

Thus, the node can add a new VC link with a different service attribute from the existing VC links to transmit data with different service attributes for different receiving parties through one point-multipoint connection. In other words, a receiving party requesting a service attribute different from the service attribute provided on the existing VC links can be accommodated with one point-multipoint VC connection.

The "service attribute" referred to above includes "best-effort" service. The communication resource allocated for the "best-effort" service is zero, i.e., the VC link is set up without resource reservation.

It should also be noted that the service attribute requested by a new leaf may be lower or higher than the service attribute provided on the input VC link. Generally, the requested service attribute will be equal to or less than the service attribute provided on the input VC link, since a receiving party cannot receive data with a service attribute higher than a sending party transmits. However, the requested service attribute might be higher than the service attribute provided upstream. This can occur if a new output VC link is going to be connected to an input VC link on which a service attribute lower than that of the sending party is provided, since the service attribute of the input VC link might later be increased.

The increase of the service attribute provided on the input VC link is practiced, for example, as follows. If the service attribute provided on the input VC link is lower than the requested service attribute, the resource allocated to this input VC link is altered to a resource corresponding to the requested service attribute before or after the new output VC link is set up.

Also, it might sometimes be preferable for efficient utilization of resources to allocate a communication resource corresponding to the service attribute provided on the input VC link even if the requested service attribute is different. This happens when the system operates according to a policy, which will be described in detail later, where a new VC link is added with a resource that does not satisfy the requested service attribute when a sufficient resource cannot be reserved.

One solution is to restrict the creation of a new output VC link with a resource corresponding to the requested service attribute to cases where the resource allocated to the input VC link satisfies the requested service attribute. Another solution is to allocate a resource that satisfies the requested service attribute to the new output VC link even if the service attribute provided on the input VC link is lower than the requested service attribute. This would be in expection that the sufficient resource will later become available and the service attribute of the input VC link will be increased afterwards.

A new VC link is added as described above. What follows is a description of a technique to change service attributes of the existing VC links of the point-multipoint connection.

First, a node has a memory for storing the resources allocated to the output VC links from the present node to the downstream nodes which constitute the point-multipoint connection. Second, the node detects which of the resources corresponding to the following service attributes is the largest of: (1) the service attributes provided to individual receiving parties ready to receive multicast communication data through the downstream node and the requested service attribute to be provided to a new receiving party who has requested to join to the multicast group, (2) the service attributes provided to the receiving parties ready to receive multicast communication data through the downstream nodes, excluding a receiving party that has requested alteration of the service attribute and the requested service attribute to be provided to the alteration-requesting receiving party, or (3) the service attributes provided to the receiving parties excluding a receiving party who has requested to leave the multicast group. Then, the node changes the resource allocated to one of the output VC links if the resource indicated by the result of the detection differs from the resource stored by the memory.

Thus, according to condition (1), when a new receiving party requests to join (participate in) the multicast group, a new VC link toward the new receiving party is added as already described, and the resource of the existing VC link is changed, if necessary. It is altered if the resource of the existing VC link to be used to transfer data toward the new receiving party does not satisfy the requested service attribute to be applied to the new receiving party. Consequently, one point-multipoint connection can be efficiently formed that provides different service attributes to different receiving parties.

Also, according to condition (2), when one of the receiving parties requests alteration of the service attribute during the multicast session, the resource of the existing VC link used to transfer data toward the alteration-requesting receiving party is changed if the resource does not correspond to the largest of the service attributes provided for the receiving parties excluding the alteration-requesting receiving party and of the requested service attribute to be applied to the alteration-requesting receiving party.

And also, according to condition (3), when one of the receiving parties requests to leave the multicast group, the resource of the existing VC link used to transfer data toward the leaving party is changed. This is done if the resource is greater than the largest of the service attributes provided for the receiving parties, excluding the leaving party, or the existing VC link is released if it becomes unnecessary. Consequently, the necessary minimum resources can be reserved in each existing VC link.

The detection can be performed by another memory in the node for storing information indicating the service attribute provided through the downstream node for each receiving party. Detection can occur by referring to the stored entries of this stored information.

The node may store in this memory, as the information indicating the service attribute provided for each receiving party, the requested service attribute to be provided to a new receiving party and/or the requested service attribute to be provided to an alteration-requesting receiving party. When the system operates so that a new VC link can be added with a resource that does not satisfy the requested service attribute if a sufficient resource cannot be reserved, as will be described in detail below, the node may store the requested service attributes in addition to the service attribute (or resource corresponding thereto) actually provided for each receiving party.

Detection can also occur by having the node receive information indicating the largest service attribute of conditions (1), (2), or (3) from the downstream node. Preferably, the node transmits another information indicating the largest service attribute of the above (1), (2), or (3) at the present node to the upstream node, which is created by comparing the information received from the downstream nodes.

The next system described includes a new VC link with a resource that does not satisfy the requested service attribute is added if a sufficient resource cannot be reserved. When a node must create a new output VC link and the node cannot create a new output VC link with a resource corresponding to the service attribute requested for the new VC link, the node creates a new output VC link to the downstream node as a new part of the point-multipoint connection with another resource such that the new VC link can be created. Then, the creation of new VC links with insufficient resources is repeated until the point-multipoint connection reaches the new receiving party.

Thus, a new VC link can be added on which a service attribute different from that of the existing input/output VC link is provided to transmit data with different service attributes for different receiving parties through one point-multipoint connection. In other words, if the service attribute requested for participation of a new receiving party cannot be provided due to resource insufficiency, minimum connectivity for the new receiving party can be provided with one VC connection. The insufficient resource allocated to the new VC link could be zero (i.e., a VC link is created with no resource reserved), or could be a value in a range that the reservation is possible. However, the former value is easier to implement than the latter.

For efficient utilization of resources, if the new output VC link with the insufficient resource is created, the node should check whether any of the resources allocated to other output VC links relating to the corresponding input VC link are larger than the insufficient resource. If not, the resource allocated to the corresponding input VC link can be changed to the insufficient resource.

The originally requested service attribute should be provided when the resource insufficiency is eliminated. Specifically, the node stores the fact that the insufficient resource has been allocated until it is recovered. While it keeps that information in memory, the node checks whether or not a sufficient resource allocation has become possible. If so, the node changes the resource allocated to the new output VC link into the resource corresponding to the requested service attribute. Then, the change of the resource of the existing VC links to which the insufficient resource has been allocated is repeated until the point-multipoint connection reaches the corresponding receiving party.

Also, if the resource at its upstream node is decreased to use resources efficiently as described, the following procedure can be adopted to provide the originally requested service attribute when the resource insufficiency is eliminated. If the resource allocated to the input VC link has been changed to the insufficient one, the node not only changes the resource of the output VC link, but also changes the resource of the input VC link into the sufficient one when it becomes possible.

B. Node Configuration

Figure 1:
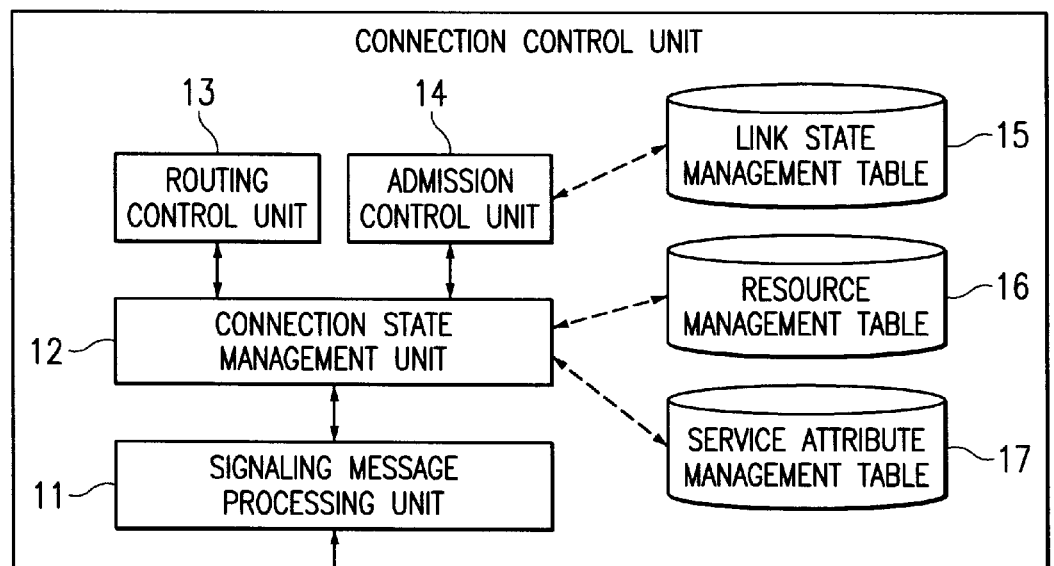

FIG. 1 is a functional block diagram of a connection control unit 10 provided at an ATM node. Connection control unit 10 includes: a signaling message processing unit 11, a connection status management unit 12, a routing control unit 13, an admission control unit 14, a link state management table 15, a resource management table 16 for each connection, and a service attribute management table 17 for each receiving party. These units can be provided either by software or by hardware.

Signaling message processing unit 11 exchanges messages relating to connection control with terminal nodes and/or neighboring ATM nodes, and notifies connection state management unit 12 of the events generated according to these message exchanges. Connection state management unit 12 carries out required processing based on these events by using information from routing control unit 13, admission control unit 14, and tables 15–17, and writes the results into the tables while notifying them to signaling message processing unit 11.

Routing control unit 13 determines which ATM node should be a downstream node of the connection to be controlled according to routing information which the present node possesses or according to routing specifying information contained in a message. Admission control unit 14 calculates the necessary resources, based on the service attribute information in a control message, and decides the allowability of new connection admission and/or the allowability of connection attribute alteration. Link state management table 15 manages information (e.g., output link capacity, current usage) necessary for admission control unit 14 to make its decisions.

A resource management table 16 exists for each connection and manages the amount of the resource allocated to each output VC link at the present ATM node. In addition, as will be described in detail later, table 16 may manage information indicating whether a resource allocated at its upstream node could be allocated when each VC link was created.

Service attribute management table 17 for each receiving party manages the requested service attributes to be given to the respective receiving parties of each contributing VC link at the present ATM node, and as is described in detail below, may manage information indicating whether or not the requested service attribute is satisfied when communication data pass through the present node.

The node can be a the following procedure can be adopted router. The cell-switched router has a network-layer level (e.g., IP) processing unit and an ATM switch. It exchanges messages to be processed at the network layer with hosts and/or neighboring cell-switched routers. According to the messages, a cut-through connection is formed through the ATM switch in the cell-switched router, and the cell-switched router transfers data bypassing IP forwarding.

C. Addition, Alteration, and Deletion of Receiving Parties

The procedure to set up a point-multipoint connection when the service attributes requested by the receiving parties of a multicast communication are nonhomogeneous can cope with addition or joining of a receiving party, alteration of the service attribute for a receiving party, and deletion or leaving of a receiving party.

FIGS. 2(*a*)–(*e*) show examples of the p-mp VC varying according to the addition, alteration, and the deletion in an exemplary ATM network. The ATM network corresponds to a plurality of logical networks in case where the node is a cell switch router. FIGS. 3(*a*)–(*e*) show changes in the corresponding information with regard to network resource management possessed by ATM node 301 under these circumstances.

Methods consistent with this invention can accommodate a new receiving party requesting a service attribute different from the service attribute provided on the existing VC links by making it possible to reserve the minimum necessary resources for each VC link. Here, a VC link (which may be referred to as a "leaf") is a portion between neighboring ATM nodes of an end-end VC connection.

In FIG. 2(*a*), a point-point connection ("p-p VC") is set up from sending party 101 to receiving party 201. Here, a call identifier of the connection will be assumed to be 10. The call identifier for each ATM node, identifies the p-mp VC for the VC link managed by that node. It is preferable to set to zero the resources for this p-p VC from receiving party 201 to sending party 101, taking into account subsequent expansion to a p-mp VC. The procedure described below is identical even when the connection that has already been set up is a p-mp VC.

When creating this p-p VC, the receiving party requests some QoS needed at the application level to the sending party by using, for example, a bandwidth reservation protocol (such as RSVP (ReSource reserVation Protocol)) at, for example, the network layer or IP (Internet Protocol) level. The sending party that has received this QoS request determines a sufficient service attribute at the ATM level (service class, traffic descriptor, cell level QoS, etc.) to satisfy the QoS request, to transmit a VC setup request.

This VC setup request is sequentially transferred to ATM nodes on the route from the sending party to the receiving party. Information containing the requested service attribute at the ATM level is also transferred as part of the VC setup request. The message can also be transferred separately from, but in association with, the VC setup request. In either case, the message is referred to a control message. This control message may be generated by the sending party and sequentially transferred to the receiving party as described above, or may be generated by the receiving party requesting QoS and sequentially transferred to the sending party.

Also, the requested service attribute to be given to the receiving party may be suitably determined by the sending party without receiving a QoS request generated by the receiving party. In this case, a VC setup request containing the control message indicating the determined requested service attribute will be sequentially transferred from the sending party to the receiving party.

ATM nodes 301, 302 receive the VC setup request (or other control message), and reserve and store VC resources on output links to satisfy the requested service attributes. Here, the output link may be VP (virtual path) link formed by logical division of a physical link, or a physical link. FIG. 3(*a*) shows the content 401 of resource management table 16 for the connection and the content 402 of service attribute management table 17 for each receiving party in ATM node 301 at this time. Although FIG. 3 describes the allocated resource is solely by bandwidth, other parameters, such as buffer capacity, could be included in the allocated resource.

The next case described is where a new receiving party 202 is added to the p-p VC whose call identifier is 10. The addition of a receiving party to an existing VC may be implemented by several methods.

According to one method, the new receiving party transmits a Leaf_Setup_Request of the leaf-initiated-join type, that is specified by the ATM signaling, to the sending party. According to another method, when the sending party and the receiving party have the Internet protocol (IP) layer as an upper layer (i.e., are IP hosts or routers), the new receiving party transmits to the sending party or to some server a request message to join an IP multicast group or an IP multicast routing information exchange message. In this case, the sending party transmits an Add_Party of the ATM signaling for requesting participation of the new receiving party, when it learns that the above IP message has been transmitted by the new receiving party. The Leaf_Setup_Request and the Add_Party are examples of a new output VC link creation request for the corresponding ATM node.

Let us assume that the new receiving party 202 does not request any specific QoS, which means that it desires a "best effort" communication. Information indicating whether or not a new receiving party is requesting QoS and if so, the details of this QoS, may be contained in the Leaf_Setup_Request as an ATM level requested service attribute. Alternatively, a control message containing ATM level requested service attribute information may be sent separately from the Leaf_Setup_Request, but in association therewith, by the new receiving party, or by the sending party that has become aware of the QoS request of the receiving party through RSVP, etc. Each ATM node can be notified of the requested service attribute for the new receiving party, with the above Leaf_Setup_Request or the control message.

Also, when the sending party learns a QoS request of the new receiving party, either by the QoS request in the IP multicast group join request message, etc., or by the RSVP message indicating the QoS request, the receiving party may transmit the Add_Party including the ATM level requested service attribute. Alternatively, a control message containing ATM level requested service attribute information may be sent separately from the Add_Party, but in association therewith, by the new receiving party or by the sending party. Each ATM node can be notified of the requested service attribute for the new receiving party with the above Add_Party or the control message.

The Add_Party is transferred first on existing leaves from the sending party, and then transferred as a VC setup request from a branch point where a new leaf is to be set up. This process continues up to the new receiving party.

In case where the node is a cell-switched router, each node can be notified of the requested service attribute for the new receiving party by the sending party or receiving party with a network-layer (IP) message, such as an RSV. Each node processes the message at network layer to determine the ATM level requested service attribute for the corresponding output VC link.

The following description takes as an example the case where the ATM signaling Add_Party is employed and the requested service attribute information is included in the Add_Party, referring to FIG. 2 and FIG. 3. In this case, sending party 101 uses an Add_Party request to addition of a new receiving party to the p-p VC destined to receiving party 201 whose call identifier is 10. UBR (Unspecified Bit Rate) service is specified as the requested service attribute contained in the Add_Party because the new receiving party requests best-effort communication, ATM node 301, which has received the Add_Party, determines its route based on the address of the receiving party to be added and/or its requested service attribute, and obtains the VPI/VCI value (in this case 80/40) in output link 2 to form a new leaf to the downstream ATM node 303.

Here, the resource allocated to the new leaf entered into resource management table 401 is provisionally zero, which corresponds to UBR service. The service attribute of receiving party 202 corresponding to VPI/VCI=80/40 in the new output link 2 is also entered into service attribute management table 402 provisionally. ATM node 301 then sends a VC setup request to the downstream ATM node 303.

Receipt of a VC setup ack, which indicates success of the setup, arrives from downstream, confirms the contents of the management tables. If a release request indicating setup failure is returned from downstream, the contents provisionally entered into the management tables are deleted. When confirmed, tables 16 and 17 become as shown in FIG. 3(b).

ATM nodes 303 and 304 expand the VC leaf by the new VC setup procedure and produce new entries in both their resource management tables (the allocated resource is zero) and their service attribute management tables (the service attribute is UBR). When the VC leaf addition process up to receiving party 202 has been completed in this way, a p-mp VC branching at ATM node 301 is formed.

Figure 2A:
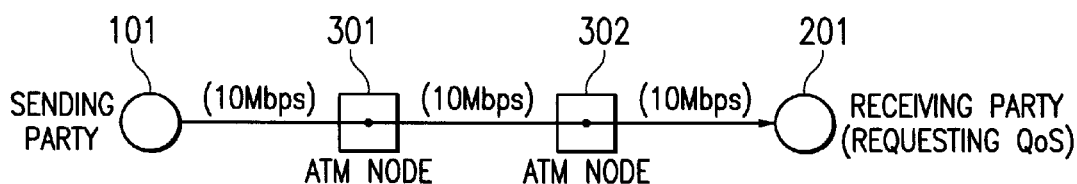
Figure 2B:
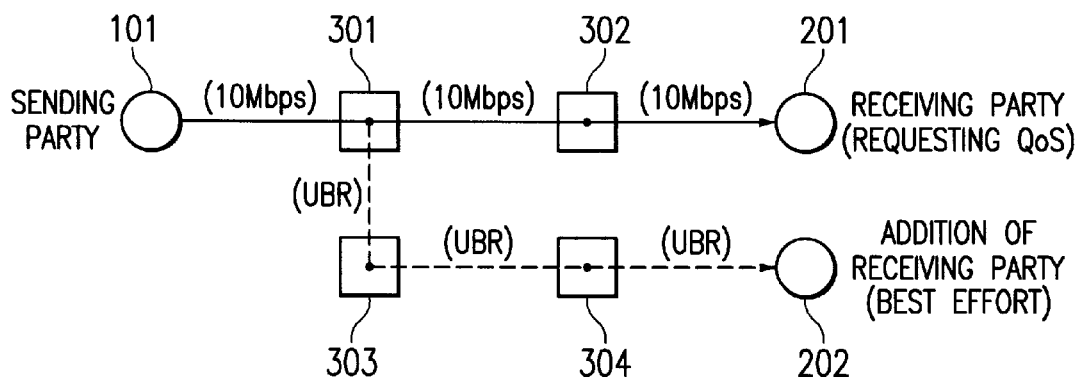

Here, as shown in FIG. 2(b), the allocated bandwidth between sending party 101 and ATM node 301, between ATM nodes 301 and 302, and between ATM node 302 and receiving party 201 are 10 Mbps, while the allocated bandwidths between the newly added ATM nodes 301 and 303, 303 and 304, and ATM node 304 and receiving party 202 are zero.

Figure 2C:
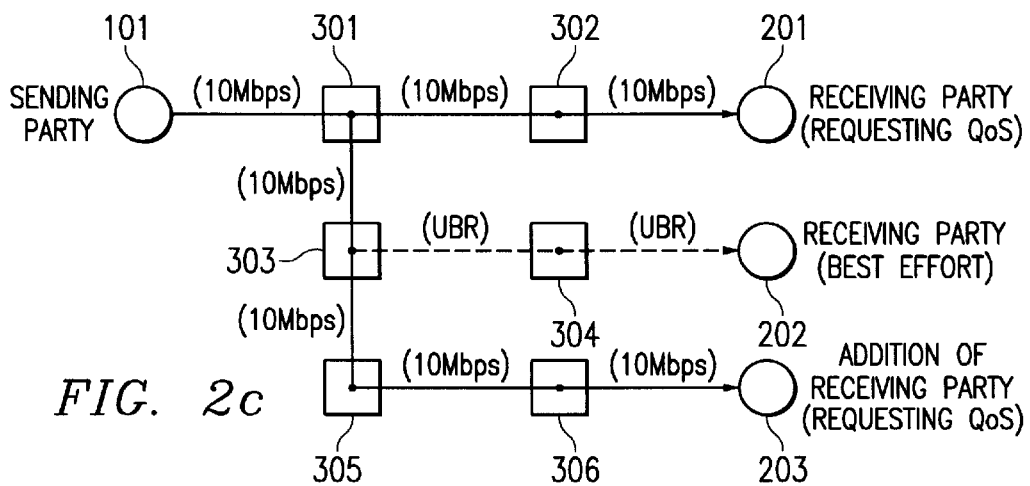

The next case described is where a further new receiving party 203 (FIG. 2(c)) is added to this p-mp VC (call identifier=10). It will be assumed that this receiving party 203 requests a prescribed QoS just as receiving party 201. Sending party 101 uses an ATM Add_Party to request the addition of a new receiving party 203 to p-mp VC whose call identifier is 10. The sending party specifies an attribute such as CBR (Constant Bit Rate) service and cell loss rate of 10–8 as the service attribute requested for the receiving party 203.

ATM node 301 receiving the Add_Party determines that its downstream ATM node is 303 (i.e., output link is 2), based either on the address and/or the requested service attribute of the receiving party to be added, or on the routing information explicitly indicated in the Add_Party. Also, node 301 checks for a leaf corresponding to the call identifier 10 from output link 2 to downstream ATM node 303, referring to a resource management table (FIG. 3(b)), and recognizes that one already exists (VPI/VCI=80/40).

However, since the allocated resource in the resource management table is zero, this VC link cannot satisfy the requested service attribute for the receiving party 203. ATM node 301 calculates the resource to be allocated for the requested service attribute, and if it finds that such allocation is practicable, it rewrites the allocated resource entry of the resource management table from zero to, for example, 10 Mbps (FIG. 3(c)). Simultaneously, ATM node 301 changes parameters (e.g., priority class, scheduler parameters) used for control of cell transfer in the leaf of output link=2, VPI/VCI=80/40 to match the allocated resource.

Also, ATM node 301 produces a new entry in the service attribute management table to store the service attribute of new receiving party 203 (for example, call identifier=10, output link=2, VPI/VCI=80/40, service attribute={CBR, 10 Mbps, CLR=10–81}). Then, ATM node 301 sends an Add_Party to downstream ATM node 303.

ATM node 303, which has received the Add_Party obtains VPI/VCI onto downstream ATM node 305, reserves the resource (in this case 10 Mbps), and updates the entries of both the resource management table and the service attribute management table. Then, ATM node 303 sends a VC setup request to downstream ATM node 305.

ATM nodes 305 and 306 expand the VC leaf by the conventional VC setup procedure, and produce new entries in their resource management tables (the allocated resource is 10 Mbps) and their service attribute management tables (the service attribute is CBR). When the VC leaf addition up to receiving party 203 has been completed in this way, a p-mp VC branching at ATM nodes 301 and 303 is formed. Here, as shown in FIG. 2(c), the bandwidths allocated to the VC links between ATM nodes 303 and 304, and between ATM node 304 and receiving party 202 are zero, while all the other VC links have a 10 Mbps bandwidth allocated.

Although one receiving party is described, several receiving parties could belong to one ATM group address. In such a case, the same QoS would be provided for the receiving parties belonging to one ATM group address.

Figure 4:
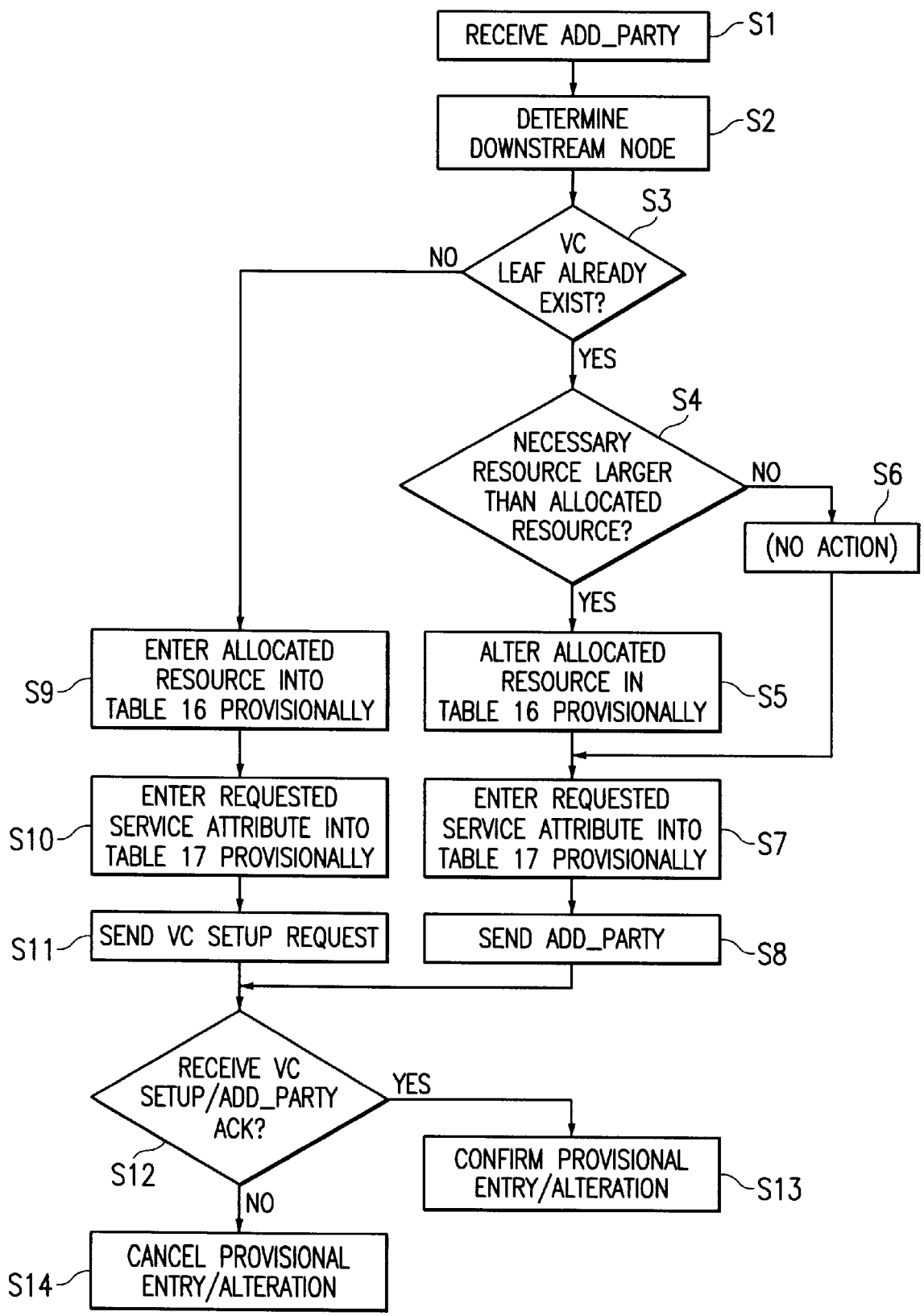
FIG. 4 shows a processing algorithm in an ATM node on addition of a new receiving party.

FIG. 4 shows a processing algorithm in an ATM node when a receiving party is to be added as described above. First, the ATM node receives an Add_Party regarding an existing VC from an upstream ATM node or sending party in signaling message processor unit 11 (S1). The Add_Party includes the address of the new receiving party and the ATM level requested service attribute. Next, the Add_Party is handed over to connection state management unit 12. Connection state management unit 12 interrogates routing control unit 13 about a downstream ATM node identified by the destination (receiving party) address in the Add_Party and/ or the requested service attributes, or by a request for a specific route. Routing control unit 13 then determines the downstream ATM node (S2).

Connection state management unit 12 checks whether a VC leaf corresponding to the Add_Party already exists in the output link to the downstream ATM node (S3). If not (S3 No), unit 12 interrogates admission control unit 14 whether the resource calculated from the requested service attribute can be allocated. Admission control unit 14 uses the information of link state management table 15 to decide whether or not it can be allocated, and notifies connection state management unit 12 of this result. If connection state management unit 12 is notified that addition of a leaf is possible, it provisionally enters information of the new leaf including the allocated resource into resource management table 16 (S9), provisionally enters information concerning the new receiving party into service attribute management table 17 (S10), and sends a VC setup request to the downstream node (S11).

If the leaf already exists (S3 Yes), connection state management unit 12 checks whether the resource necessary for the newly requested service attribute is larger than the allocated resource of the existing leaf (S4). If it is not larger, the allocated resource is left as it is (S6). If the necessary resource is larger, as in the case of a new party addition, admission control unit 14 is interrogated concerning the feasibility of resource alteration. If this is found to be feasible, the entry in resource management table 16 in respect of this leaf is provisionally altered to the resource satisfying the newly requested service attribute (S5). And, in step S5, the parameters (e.g., priority class, scheduler parameters) for cell transfer control in the leaf are also altered.

The allocated resource of the existing leaf corresponds to the largest of these service attributes provided to the receiving parties already receiving service through the downstream node. Thus, in step S4, the largest of the resources corresponding to the largest of the service attributes provided to receiving parties who are ready to receive service through the downstream node and the service attribute to be given to the new participant is compared with the allocated resource of the existing leaf.

Then, regardless of the result of step S4 check, connection state management unit 12 provisionally enters the information concerning the new receiving party into service attribute management table 17 (S7), and transfers the Add_Party to the downstream node (S8). Finally, when connection state management unit 12 receives from downstream a notification that VC-setup/party-addition has been completed or refused (S12), the provisional entry/alteration is confirmed (S13) or canceled (S14).

As described above, when adding a new receiving party to a p-p VC or p-mp VC, if a leaf to be a part of the p-mp VC is not present on the output link, a new leaf is added by allocating the necessary resource required to satisfy the service attribute to be conferred on the new receiving party. If such a VC leaf is already present on the link, the larger of (1) the resource allocated to this leaf and (2) the necessary resource for satisfying the service attribute to be conferred on the new receiving party becomes a new resource of this leaf.

The above examples show the case where a leaf of a p-mp VC to which a resource corresponding to CBR service is allocated is switched to a leaf of the p-mp VC to which a resource corresponding to a UBR service is allocated (i.e., no resource reservation). However, this switching could be performed in the same way even when, for example a leaf of a p-mp VC corresponding to VBR (Variable Bit Rate) service is switched to a leaf of the p-mp VC corresponding to UBR service.

In the case where, for example, a p-mp VC corresponding to CBR service branches out into a leaf to which a bandwidth corresponding to a VBR service is allocated, it is necessary to carry out shaping of the traffic at the ATM node where the branching takes place, such as to conform to the traffic parameters prescribed for VBR.

The next case described is where the service attribute for receiving party 203 of this p-mp VC (call identifier=10) is altered during the multicast communication service. Let us assume that receiving party 203 desires alteration of the requested service attribute from QoS to non-QoS.

Sending party 101 uses requests to an ATM signaling attribute alteration request of the ATM level service attribute conferred on receiving party 203 of the p-mp VC whose call identifier is 10. The attribute alteration request includes the call identifier, the address of the receiving party, and new attribute values. Sending party 101 may determine requests to the above alteration on its own decision, or by recognizing a desire of the receiving party for a requested service attribute alteration through a message at RSVP level, or the like. Alternatively, receiving party 203 may send, as a certain attribute alteration request, a control message containing ATM level requested service attribute information reflecting its desire.

ATM node 301, which has received the attribute alteration request, reevaluates the necessary resource to be allocated to the leaf to the downstream node involved in the alteration. The reevaluation is performed by referring to service attribute management table 17 on the basis of the information contained in the attribute alteration request.

The reevaluation is performed as follows. First, node 301 determines the largest amount of the resource corresponding to the service attributes supplied to the receiving parties (202: in this case, there is only one party, but there could be more than one), which are the receiving parties that are ready to receive service through the downstream node 303 (202, 203) except for the receiving party (203) that has requested change of QoS. Node 301 makes the determination referring to service attribute management table 17. Second, node 301 determines the largest amount of the resource corresponding to the newly requested service attribute to be supplied after the alteration to the receiving party (203) and the resource determined by the first step. This second determination is based on the information contained in the attribute alteration request. Third, if the resource determined by the second step differs from the currently allocated resource, the allocated resource must be altered.

If the reevaluation indicates that resource alteration is necessary, after confirming that the resource alteration is feasible, ATM node 301 rewrites the allocated resource entry of resource management table 16. In FIG. 3(*d*), it is rewritten from 10 Mbps to 0 Mbps. Concurrently, the parameters (e.g., priority class, scheduler parameters) for control of cell transfer in the leaf of output link=2 and VPI/VCI=80/40 in ATM node 301 are also changed.

ATM node 301 also rewrites the service attribute of receiving party 203 belonging to the VC whose call identifier is 10 in service attribute management table 17 to UBR. Then, ATM node 301 sends an attribute alteration request to downstream ATM node 303.

On receiving the attribute alteration request, ATM node 303 reevaluates the necessary resource to be allocated to the leaf to the downstream node involved in the alteration. It does so by referring to service attribute management table 17 in the same manner as described on ATM node 301. Since, at ATM node 303, the only receiving party of a leaf associated with alteration is 203, the resource necessary for the service attribute to be given to receiving party 203 is the resource to be allocated to the leaf. If the resource alteration is possible, the entries in resource management table 16 and service attribute management table 17 are updated. Then, ATM node 303 sends an attribute alteration request to downstream ATM node 305.

ATM nodes 305 and 306 alter attributes for the leaves by the ordinary attribute alteration procedure for p-p VCs. In this way, attribute alteration of the VC from sending party 101 to receiving party 203 can be implemented.

Figure 2D:
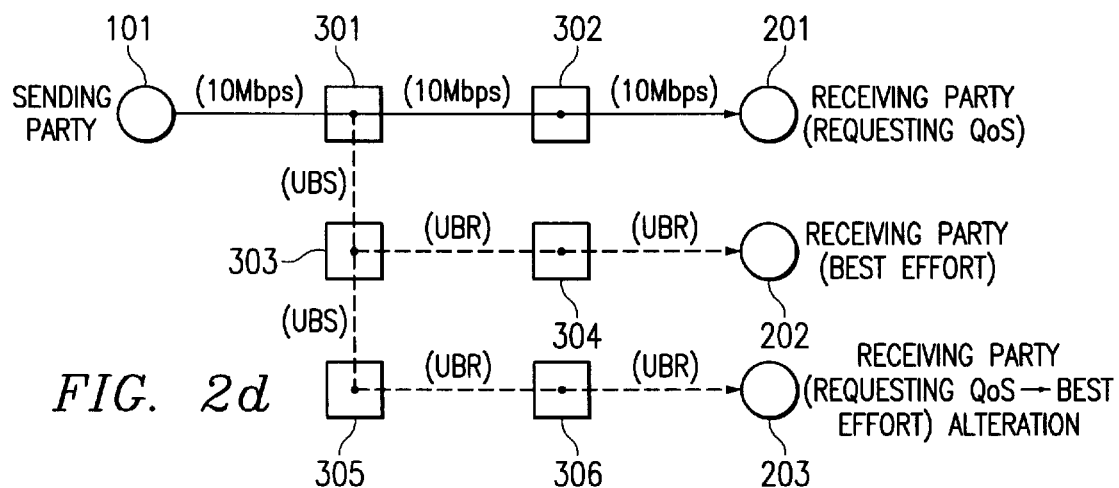

At this point, as shown in FIG. 2(d), the allocated bandwidths of the VC links between sending party 101 and ATM node 301, between ATM nodes 301 and 302, and between ATM node 302 and receiving party 201 are 10 Mbps, while the allocated bandwidths of all the other VC links are zero. This example shows the case where the alteration request is in the direction such as to reduce QoS. However, the same procedure can be applied to the case where increasing QoS is requested.

Figure 5:
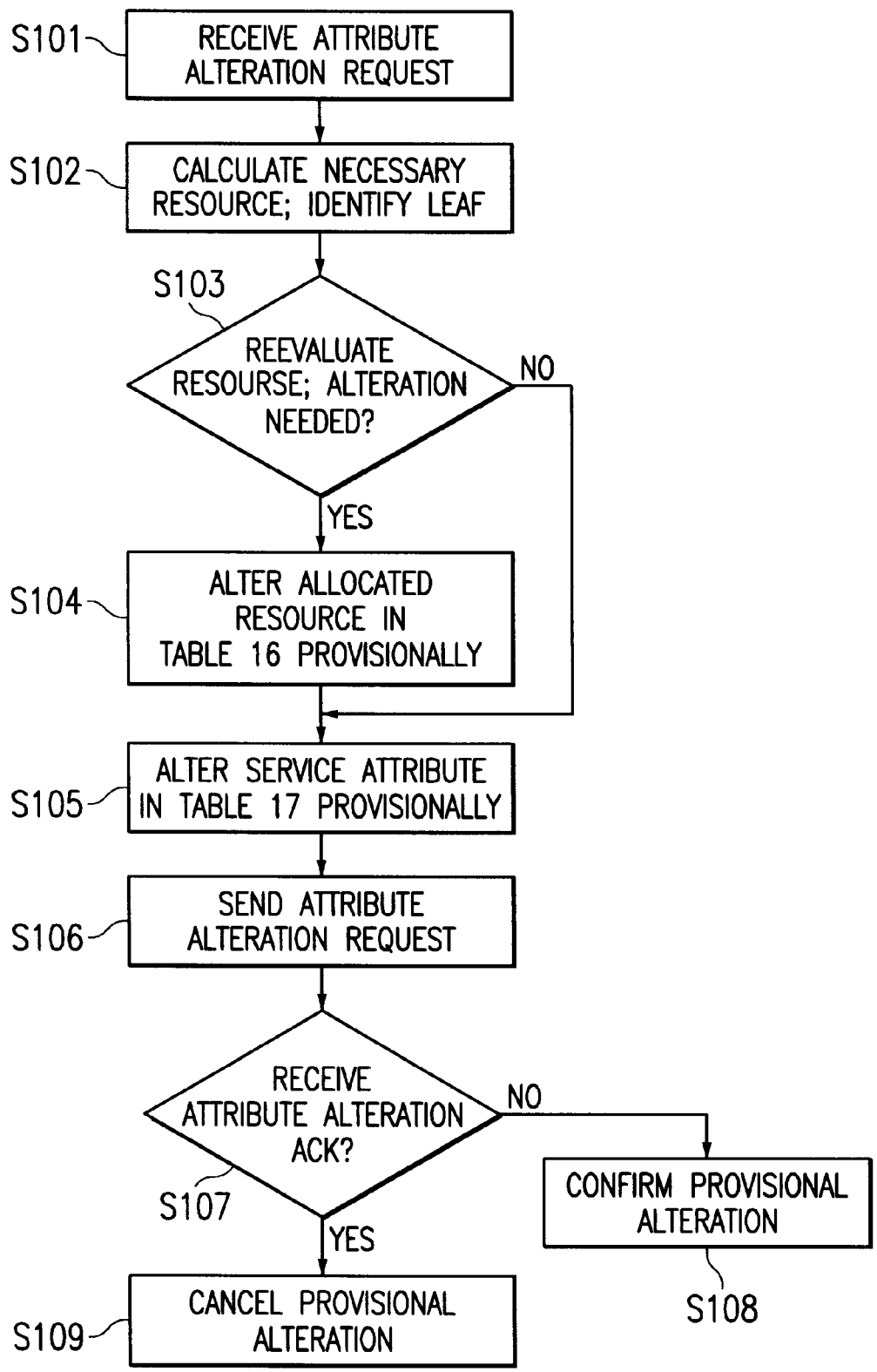
FIG. 5 shows a processing algorithm in an ATM node on service attribute alteration for one of the existing receiving parties.

FIG. 5 is a flowchart of the processing algorithm in an ATM node on service attribute alteration for one of the existing receiving parties. First, the ATM node receives an attribute alteration request from an upstream node (S101). The attribute alteration request includes the address of the alteration-requesting receiving party and the newly requested service attribute. Next, a leaf to the downstream node (output link and VPI/VCI) is identified and the necessary resource is calculated from the newly requested service attribute based on the information contained in the attribute alteration request (S102).

Connection state management unit 12 reevaluates the resource to be allocated to the leaf to the downstream node associated with the alteration, assuming that the corresponding service attribute value in the service attribute management table is altered on the basis of the received information (S103). Among the receiving parties located ahead of the leaf, the one which requires the largest resource is recognized through the reevaluation.

If the reevaluation indicates that alteration of the allocated resources is necessary (S103 Yes), connection state management unit 12 interrogates admission control unit 14 as to whether the altered resource can be allocated or not. Admission control unit 14 uses the information of link state management table 15 to decide whether or not such allocation is possible, and notifies connection state management unit 12 of the result.

If connection state management unit 12 finds that the allocated resource alteration is possible, it provisionally alters the entry of resource management table 16 with respect of the leaf to the resource to be allocated after alteration (S104). Then, irrespective of the result of the reevaluation, it provisionally alters the information in respect of the alteration-requesting receiving party in the service attribute management table 17 (S105), and sends an attribute alteration request to the downstream node (S106).

Finally, when connection state management unit 12 receives from downstream a notification that attribute alteration has been completed or refused (S107), the provisional alteration in the tables is confirmed (S108), or canceled (S109).

Figure 2E:
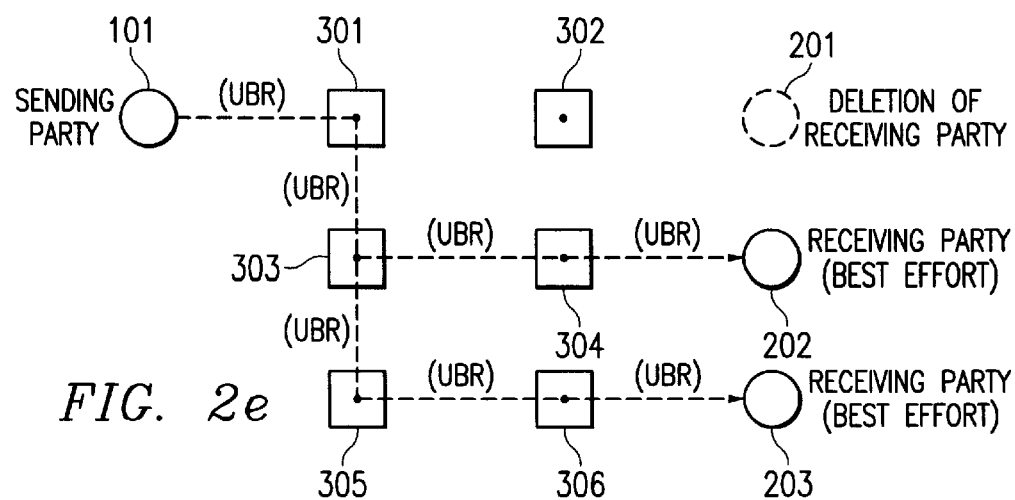

The final case described in this section is where receiving party 201 leaves the p-mp VC with call identifier 10 (FIG. 2(e)). The entry of the leaving receiving party in service attribute management table 17 is deleted at each ATM node, and the resource to be allocated to the VC leaf in each output link is determined so as to match the deletion. Specifically, sending party 101 determines the largest amount of the resource corresponding to the service attributes supplied to the receiving parties (202, 203) that are ready to receive service through the downstream node 301 (201, 202, 203) excluding the receiving party (201) that has requested to leave from the p-mp VC. It does this by referring to service attribute management table 17.

If this result is different from the currently allocated resource, sending party 101 decides that alteration of the allocated resource is necessary. If so, resource management table 16 is updated (FIG. 3(e)). In this example, since the remaining receiving parties are only provided with a service attribute of allocated bandwidth zero, the resource of the leaf between sending party 101 and ATM node 301 is altered to UBR. And ATM nodes 301 and 302 release the unnecessary leaf toward receiving party 201.

D. Alternative Way to Perform Addition, Alteration, and Deletion

According to the above embodiment, each ATM node needs to know every service attribute which is requested for each receiving party located downstream. Another method consistent with this invention reduces the information which must be informed of each ATM node to determine the resource to be allocated to a new leaf or existing leaves either on addition of a receiving party, alteration of the service attribute for a receiving party, and deletion of a receiving party.

The p-mp VC in the exemplary ATM network creates according to each case is the same as FIG. 2. Also, the information in resource management table 16 (401) in ATM node 301 changes with time in the same manner as FIG. 3.

The procedure for setting up the p-p VC (FIG. 2(a)) and adding non-QoS receiving party 202 is the same as described above with the exception that each ATM node does not require service attribute management table 17 (402).

The case will be described where a further new receiving party 203 is added to the p-mp VC to QoS requesting receiving party 201 and non-QoS receiving party 202. It will be assumed that this receiving party 203 requests a prescribed QoS just as in the case of 201. Sending party 101 requests the addition of a new receiving party 203 to p-mp VC whose call identifier is 10 using an ATM signaling Add_Party. The sending party specifies an attribute such as CBR (Constant Bit Rate) service and cell loss rate of $10^{-8}$ as the service attribute requested for the receiving party.

ATM node 301, which has received the Add_Party, determines that its downstream ATM node is 303 (i.e., output link is 2), based either on the address and/or the requested service attribute of the receiving party to be added, or on the routing specifying information in the Add_Party. Also, node 301 checks for a leaf corresponding to the call identifier 10 from output link 2 to downstream ATM node 303, referring to a resource management table (FIG. 3(b)), and recognizes one already exists (VPI/VCI=80/40).

However, since the allocated resource in the resource management table is zero, this VC link cannot satisfy the requested service attribute of receiving party 203. ATM node 301 calculates the resource to be allocated to satisfy the requested service attribute. If it finds that such allocation is practicable, it rewrites provisionally the allocated resource entry of the resource management table from zero to for example 10 Mbps (FIG. 3(c)). Simultaneously, ATM node 301 changes parameters (e.g., priority class, scheduler parameters) used for control of cell transfer in the leaf of output link=2, VPI/VCI=80/40 so as to match the allocated resource.

It is not necessary according to this method for ATM node 301 to maintain the service attribute management table, so ATM node 301 sends an Add$_{13}$ Party to downstream ATM node 303 promptly. ATM node 303, which has received the Add$_{13}$ Party, obtains VPI/VCI onto downstream ATM node 305, reserves the resource (in this case 10 Mbps), and provisionally updates the resource management table (no service attribute management table). Then, ATM node 303 sends a VC setup request to downstream ATM node 305.

ATM nodes 305 and 306 respectively expand the VC leaf by the ordinary new VC setup procedure, and produce new entries provisionally in their resource management tables (the allocated resource is 10 Mbps). The VC setup message is transferred up to receiving party 203 in this way.

When receiving party 203 decides to admit this VC setup, it transmits a VC setup ack message to sending party 101 through ATM nodes 306, 305, 303 and 301. The name of the message changes into Add$_{13}$ Party ack upstream of the ATM node 303. The ack message is used for confirming the provisional contents of the management tables.

Each ATM node receiving the ack message checks for a downstream leaf of the p-mp VC at an interface other than the interface receiving the ack. If there are none, the ATM node transfers the ack message as is. Otherwise, the ATM node needs to execute the following procedure before it sends an ack message upstream.

First, ATM node 303 in FIG. 2(c) receives from ATM node 305 the VC setup ack message including the information indicating the resource actually allocated or to be allocated based on the requested service attribute to the leaf between ATM nodes 305 and 306. Next, the ATM node 303 determines the largest of the resource indicated by the VC setup ack and the resource actually allocated (or to be allocated based on the service attribute), to the leaf between ATM nodes 303 and 304, which is the other leaf of the p-mp VC. Then, ATM node 303 enters the information indicating the determined largest resource into an Add$_{13}$ Party ack. to be sent to upstream node 301.

In this example, the information included in the VC setup ack. received from ATM node 305 indicates the resource of 10 Mbps, and the resource allocated between ATM nodes 303 and 304 is zero, so the ATM node 303 enters the resource of 10 Mbps into the Add$_{13}$ Party ack. to upstream node 301. ATM node 301, which received the Add$_{13}$ Party ack, executes the same procedure. It determines the information (the resource of 10 Mbps) to be entered into an Add$_{13}$ Party ack to be sent to sending party 101. It does so using the information (the resource of 10 Mbps) contained in the received Add$_{13}$ Party ack and the resource (10 Mbps) allocated to the leaf between ATM nodes 301 and 302 stored in the resource management table. When the ack message has reached sending party 101 in this way, a p-mp VC branching at ATM nodes 301 and 303 is formed.

Even though each ATM node does not possess a service attribute table, an ATM node can know the receiving party for which the largest resource is required among the receiving parties located ahead of the leaf. These parties include the new receiving party, the receiving party for which the service attribute is altered, and the remaining other receiving parties, excluding the leaving party.

As a result, when adding a further new receiving party, an ATM node can determine the largest service attribute to be provided on its output leaf by comparing the serve attribute requested for the further new receiving party and the service attribute corresponding to the largest resource taught by the above-mentioned ack message.

When one of the receiving parties needs to alter its service attribute, the ATM mode can recognize, by an attribute alteration ack message similar to the above-mentioned ack, the largest of the service attribute of each receiving party excluding the alteration-requesting receiving party and the service attribute to be provided after alteration, and alter the resource allocated to the output leaf to the one corresponding to the largest service attribute. When one of the receiving parties requires to leave, the ATM node can recognize, by a deletion ack message similar to the above-mentioned ack, the largest of the serviced attribute of each receiving party, excluding the deletion-requesting receiving party, and alter the resource allocated to the leaf.

Instead of the above ack messages, each node can transmit to its upstream node periodically in soft-state a message indicating the largest of the service attributes to be provided to its downstream receiving parties. Where the node is a cell-switched router, the node can use RSVP itself as this message.

E. Addition of Receiving Party in Case of Resource Insufficiency

Next, the procedure at an ATM node will be described in the case where the resource for satisfying the service attribute requested on p-mp VC setup could not be reserved in the network. This procedure is applicable to the conventional system where the same service attribute is provided on the every leaf of the p-mp VC, as is to the new system described above. Only the characteristic features are described. The various modifications already described could be suitably applied in this procedure also.

First of all, the case will be described where bandwidth insufficiency occurs at a branching point of the p-mp VC. FIG. 6 shows an example of how the p-mp VC transits according to the addition of a new receiving party in an exemplary ATM network. FIG. 7 shows how the information relating to network resource management possessed by ATM node 301 changes with time in these circumstances.

The chief difference from the conventional method is that it is possible to accommodate a new receiving party, even if the ATM node which has received a VC setup or an Add$_{13}$ Party finds that the requested service attribute cannot be satisfied due to bandwidth insufficiency. The system can avoid denying entirely the participation request of the new receiving party, and can provide minimum connectivity by performing service with a bandwidth (or without bandwidth) within a range that can be allocated.

In FIG. 6(a), a p-p VC is set up from sending party 101 to receiving party 201. Here, a call identifier of the connection will be assumed to be 10. When setting up this p-p VC, the receiving party requests some QoS needed at the application level to the sending party by using, for example, a bandwidth reservation protocol (e.g., RSVP) at, for example, the network layer level (e.g., IP level). The sending party receiving this QoS request sets up a sufficient service attribute at the ATM level (service class, traffic descriptor, cell level QoS, etc.) to satisfy the QoS request sufficiently to transmit a VC setup request.

ATM nodes 301, 302 reserve and store VC resources on output links to satisfy the requested service attributes. Here, the output link may be VP (virtual path) link which is formed by logical division of a physical link, or a physical link. FIG. 7(a) shows the content of resource management table 16 and service attribute management table 17 in ATM node 301 at this time, respectively as 401 and 402. Although the allocated resource is shown solely by the bandwidth here, other parameters, such as buffer capacity, could be included in the allocated resource.

Next, the case will be described where a new receiving party 202 is added to this p-p VC (call identifier=10). Let us assume that the new receiving party 202 requests a specific QoS just as in the case of 201. Sending party 101 requests addition of a new receiving party to the p-p VC destined to receiving party 201 whose call identifier is 10, by an ATM signaling $Add_{13}$ Party. It specifies in the $Add_{13}$ Party for example CBR service of peak rate 10 Mbps as the requested service attribute.

ATM node 301 receiving the Add_Party determines its route based on the address of the receiving party to be added and/or its requested service attribute, and obtains the VPI/VCI value (in this case 80/40) in output link 2 to form a new branching leaf to the downstream ATM node 303. It further attempts to reserve the necessary resource, but it cannot do so due to bandwidth insufficiency.

Conventionally, at this point, an $Add_{13}$ Party denial notification would be sent upstream. However, in the present method, ATM node 301 allocates some resource by lowering the resource for the new leaf so far as is permitted by the remaining bandwidth in the output link. Alternatively, ATM node 301 decides to allocate no resource to the new leaf.

FIG. 6(b) shows an example where the leaf is added to the p-p VC with the allocated resource zero (UBR). The requested service attribute (CBR) of receiving party 202 corresponding to VPI/VCI=80/40 in the new output link 2 is entered into service attribute management table 402, as shown in FIG. 7(b). Also, the information indicating that the bandwidth for satisfying the requested service attribute has not been allocated at the present node is entered into a field of "satisfaction." Here, the field of satisfaction shows whether or not the bandwidth allocated at the present node satisfies the requested service attribute for the new receiving party.

In the entry of VPI/VCI=80/40 of resource management table 401, as shown in FIG. 7(b), the bandwidth of the corresponding VC link is written as 0 Mbps. Also, into a field of "insufficiency tag," the information indicating the fact that the present ATM node 301 has allocated an unsatisfactory resource because bandwidth insufficiency occurs at the present node is entered as "ON." The field of insufficiency tag makes it possible for the node to decide to issue a bandwidth re-allocation request subsequently on its own initiative, as will be described later.

The "satisfaction" field in service attribute management table 17 simply indicates whether sufficient bandwidth has been provided at the point of the present node. That is, the "satisfaction" field will be unsatisfactory (X) in the situation that, although a sufficient bandwidth is available at the present node, the resource satisfying the requested service attribute has not been allocated at the present node because of an unsatisfactory resource allocation provoked at a certain upstream node where bandwidth insufficiency occurs. The "satisfaction" field will be X also in the case described below, that bandwidth reservation has been canceled due to bandwidth insufficiency at a downstream node.

In contrast, the "insufficiency tag" indicates whether or not an unsatisfactory resource allocation has been forced first at the present node because of bandwidth insufficiency appearing at the present node. That is, in the case of bandwidth insufficiency occurring either upstream or downstream (not at the present node), "insufficiency tag" will stay OFF in the present node.

Next, ATM node 301 sends a VC setup request to the downstream ATM node 303. In this process, ATM node 301 notifies ATM node 303 of the fact that the unsatisfactory resource has been allocated at the current node, as well as the amount of the unsatisfactory resource. It makes this ratification together with the requested service attribute (CBR), ATM nodes 303 and 304 respectively add leaves toward receiving party 202 by the ordinary procedure for VC setup, and also add new entries in the resource management table (allocated resource: zero, insufficiency tag: OFF) and in the service attribute management table (service attribute: CBR, satisfaction: X).

Rather than allocating a resource corresponding to the requested service attribute, ATM nodes 303 and 304 allocate a bandwidth in a range such that the resource allocated at upstream node 301 is not exceeded. When addition of VC leaves has been completed up to receiving party 202 in this way, a p-mp VC is formed that branches at ATM node 301.

Here, the allocated bandwidths between sending party 101 and ATM node 301, between ATM nodes 301 and 302, and between ATM node 302 and receiving party 201 are 10 Mbps, while the allocated bandwidths of the newly added leaves between ATM nodes 301 and 303, between 303 and 304, and between 304 and receiving party 202 are zero.

When receiving party 202 receives the VC setup request indicating that the unsatisfactory resource (UBR) has been allocated, it is able to decide whether to accept this or to reject it. Thus, if receiving party 202 considers that accepting insufficient QoS would not be useful it may reject admitting this VC setup.

Alternatively, sending party 101 may create a field indicating which is preferable in a case of bandwidth insufficiency: (i) some connection with nonsatisfactory resource to the receiving party, or (ii) no connection, in the $Add_{13}$ Party or VC setup request to be sent.

If the bandwidth insufficiency between ATM nodes 301–303 is eliminated, as shown in FIG. 6(c), ATM node 301 whose "insufficiency tag" is ON starts reconstructing the leaves of the p-mp VC from ATM node 301 to receiving party 202 so as to satisfy the requested service attribute. If the reconstruction succeeds, the entries of the resource management table and service attribute management table held in ATM node 301 are altered as shown in FIG. 7(c). The detailed procedure for the reconstruction will be described later.

FIG. 8 shows a processing algorithm at the ATM node that can deal with bandwidth insufficiency in the above manner.

First of all, the ATM node receives an $Add_{13}$ Party from an upstream ATM node or sending party (S1001). The $Add_{13}$ Party includes the address of the new receiving party, the ATM level requested service attribute, and the actually allocated resource at the upstream node. Next, the downstream node on the route is identified and the resource to be allocated is determined (S1002). The resource to be allocated is the minimum of the necessary resource calculated from the requested service attribute and the resource allocated at the upstream node.

If a corresponding VC leaf does not exist in the output link to the downstream ATM node (S1003--No), it checks whether or not the determined resource can be allocated (S1004). If it is possible, information of the new leaf including the determined resource is provisionally entered into resource management table 16 (S1005). And information concerning the new receiving party is provisionally entered into service attribute management table 17, while "satisfaction" flag (O in default) is set to X if the resource allocated at the upstream node is unsatisfactory (S1006). Then, it sends a VC setup request to the downstream node (S1009).

If the determined resource cannot be reserved (S1004 No), it reserves the resource that can be reserved in the output link, or allocates no resource for the new leaf. A new entry of the new leaf is provisionally added with the allocated resource in resource management table 16, and "insufficiency tag" (OFF in default) is set to ON (S1007). Information concerning the new receiving party is provisionally entered into service attribute management table 17, and "satisfaction" flag is set to X (S1008). Then, it sends a VC setup request to the downstream node (S1009).

Finally, on receiving from downstream a notification that VC-setup has been completed, or that it has been refused (S1010), the provisional addition in the tables is confirmed (S1011), or is canceled (S1012).

F. Resource Insufficiency After Branching

FIGS. 9 and 11 show examples of how the p-mp VC operates for the addition of a new receiving party in a sample ATM network where the output link bandwidth is insufficient at ATM node 303, downstream of the branching point of the p-mp VC. FIGS. 10 and 12 show how the information in resource management table 401 and service attribute management table 402 possessed by ATM node 301 change with time in these circumstances.

To cope with this kind of bandwidth insufficiency, one method shown in FIG. 9(b) is to advance VC setup by allocating unsatisfactory bandwidth (in this example, zero) to the leaves downstream of ATM node 303, just as in the case where bandwidth insufficiency occurred at ATM node 301 in FIG. 6(b).

In this case, the "insufficiency tag" at ATM node 303 is set to ON and the "satisfaction" field is set to "X." At ATM node 304, the "insufficiency tag" is still set to OFF, and the "satisfaction" field is set to "X." Because bandwidth insufficiency did not occur at ATM node 301, and to keep reserving the resource, the "insufficiency tag" is OFF, and the "satisfaction" flag is "0," as shown in FIG. 10(b).

According to this method, the bandwidth between ATM nodes 301–303 reserved as CBR will not be used well because the requested service attribute is unsatisfied for receiving party 202 due to bandwidth insufficiency occurring at downstream ATM node 303. However, ATM node 301 need not know that bandwidth insufficiency has occurred at a downstream node, since the system allocates unsatisfactory resource only from the ATM node (303) where the bandwidth insufficiency has occurred to the receiving party (202).

If the bandwidth insufficiency between ATM nodes 303–304 is eliminated, as shown in FIG. 9(c), ATM node 303 whose "insufficiency tag" is ON starts reconstructing the leaves of the p-mp VC from ATM node 303 to receiving party 202 so as to satisfy the requested service attribute. If the reconstruction succeeds, the entries of the resource management table and service attribute management table held in ATM node 303 are altered, though the contents of the tables in ATM node 301 (FIG. 10(c)) are the same as in FIG. 10(b). The detailed procedure for the reconstruction will be described later. The processing algorithm at the ATM nodes according to this method is the same as in FIG. 8.

Another method to cope with bandwidth insufficiency occurring after branching is, as shown in FIG. 11(b) and (c), to allocate unsatisfactory resource from the ATM node 303 where the bandwidth insufficiency has occurred up to the receiving party 202, and to alter, up to the branch point (ATM node 301), the bandwidth already reserved for upstream links into the same (maybe no bandwidth) value as the bandwidth allocated downstream of ATM node 303.

In this way, although the actual bandwidth insufficiency occurred in the link between ATM nodes 303–304, the allocated bandwidth changes from upstream ATM node 301 (in this example, to zero (UBR)). Consequently, unsatisfactory resources are allocated from ATM node 301 to receiving party 202. This method is more complicated than the previous method, but it has the advantage of preventing bandwidth being reserved unnecessarily.

At ATM node 301, information under the circumstances that bandwidth was safely reserved was entered into the tables, as shown in FIG. 12(b). Later, the information is rewritten, as shown in FIG. 12(c) on being notified that bandwidth insufficiency has occurred downstream.

All the upstream nodes, including the sending party, are able to learn that bandwidth insufficiency has occurred in a certain downstream node by the following methods.

One method is that receiving party 202 receives a VC setup request with the unsatisfactory resource because of bandwidth insufficiency at ATM node 303, and returns a VC setup ack. to sending party 101 indicating the fact that the allocated resource does not satisfy the requested attribute. The upstream node on the route can recognize the fact through the VC setup ack. An alternative method is that the ATM node where the bandwidth insufficiency has occurred sends upstream another control message indicating the bandwidth insufficiency, concurrently with transferring downstream VC setup request. Whichever method is adopted, the allocated resource of the corresponding VC link at ATM node 301 is altered until it becomes the same level as the resource allocated downstream (zero in this example), as shown in FIG. 12(c).

ATM node 301 alters the allocated resource after confirming that none of the receiving parties that are already receiving service through ATM node 303 has a requested service attribute that would necessitate a larger bandwidth than the unsatisfactory bandwidth allocated at the ATM node 303. In the example of FIG. 11 and FIG. 12, there is no such receiving party.

If the bandwidth insufficiency between ATM nodes 303–304 is eliminated, as shown in FIG. 11(d), reconstructing the leaves of the p-mp VC from ATM node 301 to receiving party 202 to satisfy the requested service attribute can start. If the reconstruction succeeds, the entries of the resource management table and service attribute management table held in ATM node 301 are altered as shown in FIG. 12(d). The detailed procedure for the reconstruction will be described next.

G. Recovery of Insufficient Resource

As described above, even if a midway ATM node cannot reserve a bandwidth satisfying the prescribed service attribute, it is possible to perform a connection setup with a resource that does not satisfy the prescribed service attribute from the midway ATM node to the receiving party. Subsequently, if the bandwidth insufficiency in the output link is eliminated, the allocated bandwidth of the connection can be altered so as to satisfy the requested service attribute. For putting this into practice, the following procedures can be adopted.

One method is to have a sending party or receiving party trigger the retry. In this case, the sending party or receiving party that is aware of a connection that does not satisfy the requested service attribute sends a bandwidth alteration request after a suitable time interval. The receiving party can recognize that fact by receiving a VC setup request with the unsatisfactory resource. The sending party can know that fact by receiving a VC setup ack. or another control message at ATM level from the receiving party, or by receiving some message at IP level.

The ATM node (e.g., ATM node 301 in FIG. 6(b), ATM node 303 in FIG. 9(b), ATM node 301 in FIG. 11(c)) whose "satisfaction" is X and which has received the bandwidth alteration request checks whether the bandwidth reservation for satisfying the requested service attribute is currently possible in the link (e.g., between 301–303, 303–304, 301–303). If it is possible, the bandwidth is reserved, the entry of the resource management table is updated, and the bandwidth alteration request is transferred to the downstream ATM node. When this process is repeated on the leaves with unsatisfactory bandwidths up to receiving party 202, it is achieved to alter the bandwidth of the connection such as to satisfy the requested service attribute.

An alternative method is for the head node of the leaves with unsatisfactory bandwidths to trigger the retry. The ATM node (e.g., ATM node 301 in FIG. 6(b), ATM node 303 in FIG. 9(b), ATM node 301 in FIG. 11(c)) checks the information relating to the usage of resources in each of the links that is periodically exchanged through some protocol with the other ATM nodes. When this ATM node decides, based on this checking, that free bandwidth has now become available for the link (e.g., between 301–303, 303–304, 303–304) where the bandwidth insufficiency occurred, it alters the bandwidth of the leaf to its downstream node such as to satisfy the requested service attribute, updates the entry in the resource management table, and transmits a bandwidth alteration request to the downstream node.

Where the link (between ATM nodes 303–304) at which bandwidth insufficiency occurred is not directly connected to the ATM node (301), and no protocol such as described above is actuated, ATM node 301 in FIG. 11(c) can periodically send a bandwidth alteration request.

In that alternative method, each ATM node needs to know whether it is the head node of the leaves with unsatisfactory bandwidths. In case of FIG. 6 and FIG. 9, the node whose "insufficiency tag" is ON is the head node.

In case of FIG. 11, the resource management table at each ATM node should have a field of "head tag." On setting up a leaf of the p-mp VC, the node sets the "head tag" field (OFF in default) to ON, if it cancels the reservation of the resource due to the downstream bandwidth insufficiency and it no longer sends upstream an ack or other message that indicates the bandwidth insufficiency. Then, each node can recognize that it is the head when its "head tag" is ON.

Also, it is possible that the ATM node (303 in FIG. 11(c)) where the bandwidth insufficiency occurred triggers the retry. In this case, the ATM node whose "insufficiency tag" is ON sends upstream a control message corresponding to the bandwidth alteration request, as well as downstream.

V. CONCLUSION

In addition to those already mentioned above, persons of ordinary skill will realize that many modifications and variations of the above embodiments may be made without departing from the novel and advantageous features of the present invention. Accordingly, all such modifications and variations are intended to be included within the scope of the appended claims.

The specification and examples are only exemplary. The following claims define the true scope and spirit of the invention.

What is claimed is:

1. A network node apparatus for multicast communication service to transmit communication data from a sending party to multiple receiving parties using an input VC (Virtual Channel) and output VCs, the node comprising:

multicast maintenance means for maintaining a point-multipoint connection to be used for the multicast communication service;

reception means for receiving a new VC link creation request for the multicast communication service and a requested service attribute for the new VC link; and creation means for adding to the point-multipoint connection, in response to the new VC link creation request, a new output VC link, the creation means including means for examining the requested service attribute, and means for adding the new output VC link with a service attribute that differs from a service attribute of the input VC link.

2. The network node apparatus according to claim 1, wherein the multicast maintenance means and the creation means reside in the same physical unit.

3. The network node apparatus according to claim 1, wherein the creation means includes means for adding the new output VC link with the requested service attribute.

4. The network node apparatus according to claim 3, wherein the service attribute requested for said new output VC link includes a best-effort service for which resources are not reserved.

5. The network node apparatus according to claim 1, wherein the creation means comprises means for determining a resource to satisfy the requested service attribute for said new output VC link; and means for allocating the determined resource to said new output VC link.

6. The network node apparatus according to claim 5, wherein the allocating means includes means for allocating a zero-resource when the requested service attribute for said new output VC link is a best-effort service.

7. The network node apparatus according to claim 5, wherein the allocating means includes means for allocating a resource smaller than a resource allocated to the input VC link.

8. The network node apparatus according to claim 1, wherein the creation means includes means for adding said new output VC link with a service attribute identical to the requested service attribute when the service attribute for the input VC link is not less than the requested service attribute.

9. The network node apparatus according to claim 1, wherein the reception means includes
    means for receiving the requested service attribute in the new VC link creation request, and
    wherein the creation means includes
        means for adding said new output VC link with the requested service attribute.

10. The network node apparatus according to claim 1, wherein the reception means includes
    means for receiving the requested service attribute in the new VC link creation request, at a datalink layer, and
    wherein the creation means includes
        means for processing the new VC link creation request at the datalink layer; and
        means, responsive to the processing means, for adding said new output VC link with the requested service attribute.

11. The network node apparatus according to claim 1, wherein the reception means includes
    means for receiving a message including the requested service attribute, and
    wherein the creation means includes
        means for adding said new output VC link with the requested service attribute.

12. The network node apparatus according to claim 1, wherein the reception means includes
    means for receiving a message including the requested service attribute at network layer, and
    wherein the creation means includes
        means for processing the message at the network layer; and
        mean, responsive to the processing means, for adding said new output VC link with the requested service attribute.

13. The network node apparatus according to claim 1, wherein the creation means includes
    means for adding said new output VC link with a service attribute different from the requested service attribute when there are not sufficient resources to satisfy the requested service attribute.

14. The network node apparatus according to claim 13, wherein the creation means includes
    means for allocating as an insufficient resource a resource that does not exceed an available resource.

15. The network node apparatus according to claim 14, wherein the allocating means includes
    means for allocating a zero-resource irrespective of the available resource.

16. The network node apparatus according to claim 14, further comprising,
    means for altering the resource allocated to said new output VC link from the insufficient resource to the sufficient resource when the sufficient resource becomes available.

17. The network node apparatus according to claim 16, further comprising,
    means for recording that the insufficient resource has been allocated, and
    means for checking if the sufficient resource has become available while the recording means records that a sufficient resource could not be allocated; and
    means for activating the altering means, responsive to the checking means.

18. A network node apparatus for multicast communication service to transmit communication data from a sending party to multiple receiving parties using VCs (Virtual Channels), the node comprising:
    multicast maintenance means for maintaining a point-multipoint connection for multicast communication service using an input VC link and output VC link;
    a memory for storing information indicating a resource allocated to the output VC link;
    determining means for determining whether to alter the allocated resource of the output VC link by detecting a change regarding the receiving parties that affects the largest of service attributes to be provided to the receiving parties; and
    reallocation means, responsive to the determining means, for allocating a new resource as an altered resource to the output VC link.

19. The network node apparatus according to claim 18, wherein the determining means includes
    means for detecting addition of a new receiving party.

20. The network node apparatus according to claim 18, wherein the determining means includes
    means for detecting alteration of a service attribute for one of the receiving parties.

21. The network node apparatus according to claim 18, wherein the determining means includes
    means for detecting deletion of one of the receiving parties.

22. The network node apparatus according to claim 19, wherein the determining means includes
    means for ascertaining the largest of a requested service attribute to be provided to the new receiving party and a service attribute provided to each receiving party ready to receive multicast communication data through the output VC link, and
    means for checking whether the ascertained largest resource differs from the resource indicated by the information stored in the memory; and
    wherein the reallocation means includes
        means for allocating the ascertained largest resource as the new resource.

23. The network node apparatus according to claim 20, wherein the determining means includes
    means for ascertaining the largest of a requested service attribute for the one of the receiving parties for whom the service attribute is to be altered and a service attribute provided to each of the other receiving parties ready to receive multicast communication data through the output VC link, and
    means for checking whether the ascertained largest resource differs from the resource indicated by the information stored in the memory; and
    wherein the reallocation means includes
        means for allocating the ascertained largest resource as the new resource.

24. The network node apparatus according to claim 21, wherein the determining means includes
    means for ascertaining the largest of a service attribute provided to each receiving party ready to receive multicast communication data through the output VC link other than the one of the receiving parties to be deleted, and
    means for checking whether the ascertained largest resource differs from the resource indicated by the information stored in the memory; and
    wherein the reallocation means includes means for allocating the ascertained largest resource as the new resource.

25. The network node apparatus according to claim 18, further comprising means, responsive to the reallocation means, for entering information indicating the altered resource into the memory.

26. The network node apparatus according to claim 18, further comprising means for storing in the memory service attribute information identifying a service attribute provided to each receiving party ready to receive multicast communication data through the output VC link; and wherein the determining means includes means for examining the service attribute information to determine whether to alter the resource.

27. The network node apparatus according to claim 26, wherein the storing means includes means for including information indicating a requested service attribute to be provided to the new receiving party in the service attribute information.

28. The network node apparatus according to claim 26, wherein the means for storing includes means for including information indicating a requested service attribute to be provided to said one of the receiving parties for whom the service attribute is to be altered in the service attribute information.

29. The network node apparatus according to claim 18, further comprising, means for receiving a message from a downstream node of the output VC link indicating the largest of the service attributes provided to the receiving parties ready to receive multicast communication data through the output VC link; and wherein the determining means includes means for referring to the message to determine whether to alter the resource.

30. The network node apparatus according to claim 29, further comprising, means for transmitting to an upstream node of the input VC link a message indicating the largest of the service attributes provided to the receiving parties ready to receive multicast communication data through a plurality of output VC links connected to the input VC link.

31. The network node apparatus according to claim 18, wherein the allocated resource may correspond to best effort service.

32. The network node apparatus according to claim 18, wherein the new resource may correspond to best effort service.

33. A method for controlling a multicast communication service in a connection-oriented network to transmit communication data from a sending party to multiple receiving parties via Virtual Channels (VCs), the method comprising the steps of:

maintaining output VC links to be connected to an input VC link, the VC links being parts of a point-multipoint connection used for the multicast communication service;

receiving a new VC link creation request; and adding a new output VC link to the point-multipoint connection in response to the receipt of a new VC link creation request, the output VC link having a service attribute that is the smaller of a service attribute of the input VC link and a service attribute requested for said new output VC link.

34. The method according to claim 33, further comprising the step of increasing a service attribute provided on the input VC link up to the service attribute requested for said new output VC link.

35. The method according to claim 33, wherein the adding step includes the step of providing on said new output VC link a service attribute different from that of the input VC link when the service attribute of the input VC link exceeds the service attribute requested for said new output VC link.

36. A method for controlling a multicast communication service in a connection-oriented network to transmit communication data from a sending party to multiple receiving parties via Virtual Channels (VCs), the method comprising the steps of:

maintaining output VC links to be connected to an input VC link, the VC links being parts of a point-multipoint connection used for the multicast communication service;

storing information indicating a resource allocated to the output VC link in a memory;

determining a need to alter the resource of the output VC link by detecting a change regarding the receiving parties that affects the largest of service attributes to be provided to the receiving parties; and reallocating a new resource as an altered resource to the output VC link in response to the determination of a need to alter the resource.

37. A method in accordance with claim 36 wherein the determining step includes the step of detecting addition of a new receiving party.

38. A method in accordance with claim 36 wherein the determining step includes the step of detecting alteration of a service attribute for one of the receiving parties.

39. A method in accordance with claim 36 wherein the determining step includes the step of detecting deletion of one of the receiving parties.

40. A method in accordance with claim 36, wherein the allocated resource may correspond to best effort service.

41. A method in accordance with claim 36, wherein the new resource may correspond to best effort service.

42. A method for controlling a multicast communication service in an ATM network to transmit communication data from a sending party to multiple receiving parties via Virtual Channels (VCs), the method comprising the steps of:

maintaining output VC links to be connected to an input VC link, the VC links being parts of a point-multipoint connection used for the multicast communication service;

receiving a new VC link set-up request;

noting that sufficient resources do not exist to satisfy a service attribute requested for a new output VC link; and adding to the point-multipoint connection, in response to the receipt of the new VC link set-up request, said new output VC link to which an insufficient resource is allocated.

43. The method according to claim 44, wherein the adding step includes the step of providing a service attribute different from that of the input VC link on said new output VC link when the service attribute of the input VC link is not less than the service attribute requested for said new output VC link.

44. The method according to claim 44, further comprising the step of reallocating a smaller resource to the input VC link when the resource reserved for the input VC link exceeds the largest of the resources allocated to the output VC links including said new output VC link.

45. The method according to claim 42, further comprising the steps of, altering the resource allocated to said new output VC link from the insufficient resource to the sufficient resource when the sufficient resource has become available; and requesting alteration of a resource allocated to a downstream output VC link of said new output VC link.

46. The method according to claim 44, further comprising the step of altering the resource allocated to said new output VC link from the insufficient resource to the sufficient resource, and the resource reallocated to the input VC link from the smaller resource to the sufficient resource, when the sufficient resource has become available.

47. The method according to claim 42, wherein the allocated resource may correspond to best effort service.

* * * * *